(12) United States Patent
Oka et al.

(10) Patent No.: US 11,559,894 B2
(45) Date of Patent: Jan. 24, 2023

(54) OBJECT HANDLING CONTROL DEVICE, OBJECT HANDLING DEVICE, OBJECT HANDLING METHOD, AND COMPUTER PROGRAM PRODUCT

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Yoshifumi Oka, Yokohama (JP); Yasunori Chiba, Yokohama (JP); Tetsuya Masuda, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 339 days.

(21) Appl. No.: 16/902,313

(22) Filed: Jun. 16, 2020

(65) Prior Publication Data

US 2020/0391385 A1 Dec. 17, 2020

(30) Foreign Application Priority Data

Jun. 17, 2019 (JP) .............................. JP2019-112218

(51) Int. Cl.
*B25J 9/16* (2006.01)
*B25J 13/08* (2006.01)
(Continued)

(52) U.S. Cl.
CPC ............. *B25J 9/1666* (2013.01); *B25J 9/161* (2013.01); *B25J 9/1633* (2013.01); *B25J 13/085* (2013.01);
(Continued)

(58) Field of Classification Search
CPC ........ B25J 9/1666; B25J 9/161; B25J 9/1633; B25J 13/085; B25J 9/163; B25J 15/02;
(Continued)

(56) References Cited

U.S. PATENT DOCUMENTS 6,293,750 B1 * 9/2001 Cohen ................. G01N 35/0099
901/17
6,699,007 B2 * 3/2004 Huang ................. B65G 47/905
414/21

(Continued)

FOREIGN PATENT DOCUMENTS

DE        697 30 758 T2    9/2005
DE  11 2011 105 151 T5    1/2014
(Continued)

*Primary Examiner* — Jaime Figueroa
(74) *Attorney, Agent, or Firm* — Maier & Maier, PLLC

(57) ABSTRACT

An object handling control device includes one or more processors configured to acquire at least object information and status information representing an initial position and a destination of an object; set, when a grasper grasping the object moves from the initial position to the destination, a first region, a second region, and a third region in accordance with the object information and the status information; and calculate a moving route along which the object is moved from the initial position to the destination with reference to the first region, the second region, and the third region.

5 Claims, 25 Drawing Sheets

(51) Int. Cl.
*B25J 19/02* (2006.01)
*B25J 15/02* (2006.01)
*B25J 19/04* (2006.01)

(52) U.S. Cl.
CPC ........... *B25J 9/163* (2013.01); *B25J 15/02* (2013.01); *B25J 19/022* (2013.01); *B25J 19/04* (2013.01)

(58) Field of Classification Search
CPC ....... B25J 19/022; B25J 19/04; B25J 9/1697; G05B 2219/40517; G05B 2219/40519
USPC ................. 700/245–264; 318/568.11–568.25
See application file for complete search history.

(56) References Cited

U.S. PATENT DOCUMENTS

| | | | | |
|---|---|---|---|---|
| 7,210,894 B2* | 5/2007 | Huang | ............... | B65G 47/905 414/21 |
| 7,266,422 B1* | 9/2007 | DeMotte | ............... | B25J 9/1687 414/801 |
| 8,615,321 B2* | 12/2013 | Baldes | ............... | B65G 61/00 700/214 |
| 8,615,386 B2* | 12/2013 | Baldes | ............... | G06F 30/23 703/7 |
| 9,132,548 B2* | 9/2015 | Kamiya | ............... | B25J 9/1669 |
| 9,415,511 B2* | 8/2016 | Gotou | ............... | B25J 9/1697 |
| 9,988,216 B1* | 6/2018 | McCalib, Jr. | ........ | B65G 47/843 |
| 10,549,928 B1* | 2/2020 | Chavez | ............... | B25J 9/1697 |
| 2010/0138030 A1* | 6/2010 | Kohlmaier | ............ | B25J 9/1684 700/192 |
| 2014/0277719 A1* | 9/2014 | Kamiya | ............... | B25J 9/1669 700/259 |
| 2015/0045949 A1* | 2/2015 | Hashiguchi | ............ | B25J 9/1664 700/264 |
| 2015/0127162 A1* | 5/2015 | Gotou | ............... | B25J 9/1612 700/259 |
| 2016/0059419 A1* | 3/2016 | Suzuki | ............... | B25J 9/1692 901/14 |
| 2018/0065806 A1* | 3/2018 | Sugahara | ............... | B25J 9/04 |
| 2018/0065818 A1 | 3/2018 | Gondoh et al. | | |
| 2018/0086489 A1* | 3/2018 | Rogers | ............... | B25J 9/042 |
| 2018/0194008 A1* | 7/2018 | Namiki | ............... | G06T 7/80 |
| 2018/0238923 A1* | 8/2018 | Abe | ............... | B25J 9/1679 |
| 2018/0290307 A1* | 10/2018 | Watanabe | ............... | G06T 7/97 |
| 2019/0351549 A1* | 11/2019 | Suzuki | ............... | B25J 15/0253 |
| 2020/0078941 A1 | 3/2020 | Oka et al. | | |

FOREIGN PATENT DOCUMENTS

| | | |
|---|---|---|
| DE | 10 2012 007 254 B4 | 10/2015 |
| DE | 10 2016 001 174 B4 | 5/2018 |
| DE | 10 2017 002 354 A1 | 9/2018 |
| JP | 2000-42956 A | 2/2000 |
| JP | 2010142910 A * | 7/2010 |
| JP | 2014-65098 A | 4/2014 |
| JP | 2020-40158 A | 3/2020 |

* cited by examiner

OBJECT HANDLING CONTROL DEVICE, OBJECT HANDLING DEVICE, OBJECT HANDLING METHOD, AND COMPUTER PROGRAM PRODUCT

CROSS-REFERENCE TO RELATED APPLICATIONS

This application is based upon and claims the benefit of priority from Japanese Patent Application No. 2019-112218, filed on Jun. 17, 2019, the entire contents of which are incorporated herein by reference.

FIELD

Embodiments described herein relate generally to an object handling control device, an object handling device, an object handling method, and a computer program product.

BACKGROUND

Conventionally, object handling devices including a robot arm have been introduced for the purpose of automating physical distribution or manufacturing in field site, for example. An object handling device grasps an object with a hand and moves or transfers an object from an initial position, such as on a conveyor or in a container storing the object, to a destination, such as in a given container or a palette. In this case, it is preferable for the grasped object and the hand of the object handling device not to interfere with surrounding obstacles. In reality, however, the object and the hand may interfere due to influence of the operational accuracy of the hand or error in measurement of the object size, a grasp position, a container wall at a destination, a previously moved object (hereinafter, may be referred to as an obstacle). In view of this, an object handling device is proposed, which includes a robot hand equipped with a force sensor that detects reaction force from an end effector. Such an object handling device performs feedback force control based on the reaction force to repulsively move a robot away from an interfering obstacle. Thereby, the robot is prevented from collision and stopping moving to be continuously operable.

However, the hand or the grasped object may be still damaged through the repulsive motion under the force control, depending on the speed of the hand or the grasped object at the time of collision with the obstacle. In such a case, collision impact can be reduced by lowering the operational speed of the arm or hand in the entire moving route or in an area in the vicinity of the obstacle. This may however prolong a length of time for transferring the object, lowering work efficiency. Alternatively, in planning the moving route to ensure a distance to the obstacle, collision risk can be lowered by estimating larger virtual sizes of the hand, the grasped object, and the obstacle than their actual sizes, that is, setting a large margin. This may however make it impossible to plan the moving route when the hand is to enter a narrow gap or densely arrange the objects.

It is thus preferable to provide an object handling control device, an object handling device, an object handling method, and a computer program product that can avoid a hand or an object grasped by the hand from interfering with an obstacle, which may otherwise damage them, and efficiently transfer the object.

DETAILED DESCRIPTION

According to one embodiment, in general, an object handling control device includes one or more processors. The one or more processors are configured to acquire at least object information and status information, the object information representing an object grasped by a grasper, the status information representing an initial position and a destination of the object; set, when the grasper grasping the object moves from the initial position to the destination, a first region, a second region, and a third region in accordance with the object information and the status information, the first region being a region in which the grasper is allowed to move without being restricted by an obstacle present in a space between the initial position and the destination, the second region being a region in which the grasper is restricted from moving due to the obstacle, the third region at least part of which is set below the second region, the third region being a region in which the grasper is operated under force control; and calculate a moving route along which the object is moved from the initial position to the destination with reference to the first region, the second region, and the third region.

The following will describe embodiments with reference to the accompanying drawings. Features of embodiments and functions and results or effects attained by the features are presented by way of example only, and are not intended to limit the scope of the embodiments.

Overall System Configuration

Figure 1:
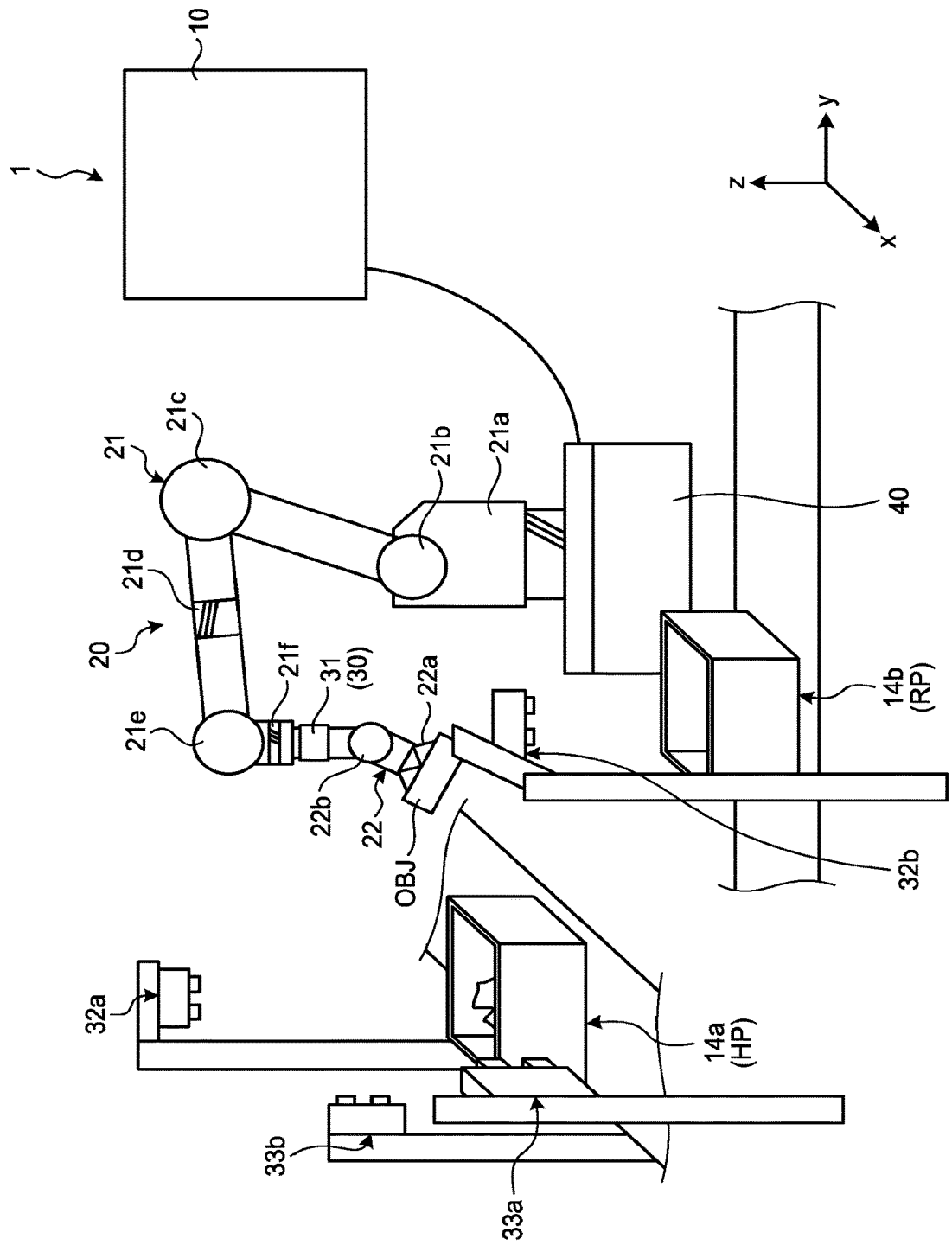
FIG. 1 is an exemplary and schematic configuration diagram of an object handling system including an object handling device according to an embodiment.

FIG. 1 is a schematic configuration diagram of an object handling system 1 including an object handling device. The object handling system 1 includes a control device 10, a manipulator 20 (robot arm), a sensor 30, and a housing 40. The object handling system 1 serves to grasp an intended object OBJ to move at an initial position HP, moves or conveys the object OBJ, and releases it at a moving destination RP. Such an operation is referred to as picking, transfer, conveyance of the object OBJ. Of the control device 10, the elements, except for a later-described robot controller 57 (motion controller) that controls the manipulator 20, may be separately provided as an object handling control device.

The manipulator 20 includes an arm 21 and a hand 22, i.e., an end effector or a grasper. For example, the arm 21 serves as a multi-joint robot including rotational parts 21a to 21f that are rotated by a plurality of (for example, six) servomotors. The manipulator 20 may include a replaceable hand 22. In this case, the hand 22 may be replaced using a mechanism such as a tool changer (not illustrated). The arm 21 is not limited to the multi-joint robot, and may be a SCARA robot, a linear motion robot, or a combination of at least two of a multi-joint robot, a SCARA robot, and a linear motion robot.

In the example of FIG. 1, the hand 22 includes a suction pad 22a with a pressure sensor (not illustrated). The suction pad 22a serves as a suction mechanism for grasping the object OBJ. Specifications of the suction pad 22a such as the number, placement, shape, and size can be variously changed or set.

The grasp mechanism for the object OBJ is not limited to the suction mechanism, and may include a jamming mechanism, a pinching mechanism, or a multi-finger mechanism, for example. The hand 22 may include at least two of a suction mechanism, a jamming mechanism, a pinching mechanism, and a multi-finger mechanism.

The hand 22 includes a bend 22b. The hand 22 can further include a movable part such as a rotational part or an extendable part in addition to the bend 22b, for example.

The sensor 30 of the hand 22 represents a six-axis, i.e., three-axis translational force and three-axis moment, force sensor 31. The position of the force sensor 31 is not limited to the one illustrated in the drawing. The hand 22 may include various sensors other than the force sensor 31. As described later, in the present embodiment, to fill a given space with objects OBJ without a gap, the hand 22 can feed back a detected value of the force sensor 31 for placing the object OBJ, and press the object OBJ against an obstacle at a moving destination under force control. Such force control over pressing the object OBJ against the obstacle at the moving destination is referred to as pressing control. Additionally, in the embodiment, if the hand 22 or the object OBJ interferes with an obstacle under the force control based on the detected value of the force sensor 31, the hand 22 and the object OBJ can be moved away from the interfering obstacle. Such force control over the hand 22 and the object OBJ to move away from the interfering obstacle is referred to as repulsive control.

The sensor 30 may be a torque sensor, a rotation sensor, or a current sensor of a motor included in each of the rotational parts 21a to 21f in addition to the force sensor 31. In this case, the control device 10 may find force acting on the hand 22 from the detected value of the force sensor 31, or may calculate the force from a current value or a rotation value (detected value of the rotation sensor) of each motor.

The sensor 30 of the object handling system 1 includes a plurality of cameras 32a and 32b and a plurality of laser range scanners 33a and 33b, for example. The cameras 32a and 32b are, for example, RGB image cameras. The laser range scanners 33a and 33b are two-dimensional scanning, optical ranging sensors that measure a distance to the object OBJ with scanning light, and may also be called a laser rangefinder (LRF) or a light detection and ranging (LIDAR).

The camera 32a is located in the initial position to image the object OBJ and the surroundings thereof from above at the initial position HP of the object OBJ to be grasped and moved or conveyed and acquire object information (such as a shape or a size) and status information (such as a stationary pose) on the object OBJ. At the initial position HP, the object OBJ is housed in a container 14a such as a stowage or a palette. In such a case, the camera 32a generates an image of all or part of inside the container 14a. The initial position HP may also be referred to as a motion start position or a departure position of the object OBJ. In FIG. 1, the container 14a is placed on a conveying mechanism such as a conveyor belt for exemplary purpose only, and the location thereof is not limited thereto.

The camera 32b is located in the moving destination RP for releasing, arranging, or placing the object OBJ, to image the moving destination RP and the surroundings thereof, and acquire the object information on the object OBJ (such as a shape or a size of a previously set object) and status information (such as a pose of a previously set object). At the moving destination RP, the object OBJ is housed in a release-purpose container 14b such as a stowage or a palette, for example. In such a case, the camera 32b generates an image of all or part of inside the container 14b. The moving destination RP can also be referred to as a moving stop position or an arrival position of the object OBJ. In FIG. 1, the container 14b is placed on a conveying mechanism such as a conveyor belt, but the location of the container 14b is not limited thereto.

The laser range scanners 33a and 33b acquire the object information such as the size of the object OBJ (including a size of a surface that cannot be captured by the camera 32a) and the status information such as a hand 22's grasping pose of the object OBJ while the arm 21 moves the object OBJ grasped with the hand 22 from the initial position HP to the moving destination RP. The object information acquired by the cameras 32a and 32b and the laser range scanners 33a and 33b can be used in positioning control over dense placement of the objects OBJ in the container 14b at the moving destination RP.

The housing 40 may house, for example, various components or elements and devices of the object handling system 1 such as a power supply for driving an electric actuator such as a motor, a cylinder for driving a fluid actuator, a tank, a compressor, and various safety mechanisms. The housing 40 can house the control device 10.

Control Device

Figure 2:
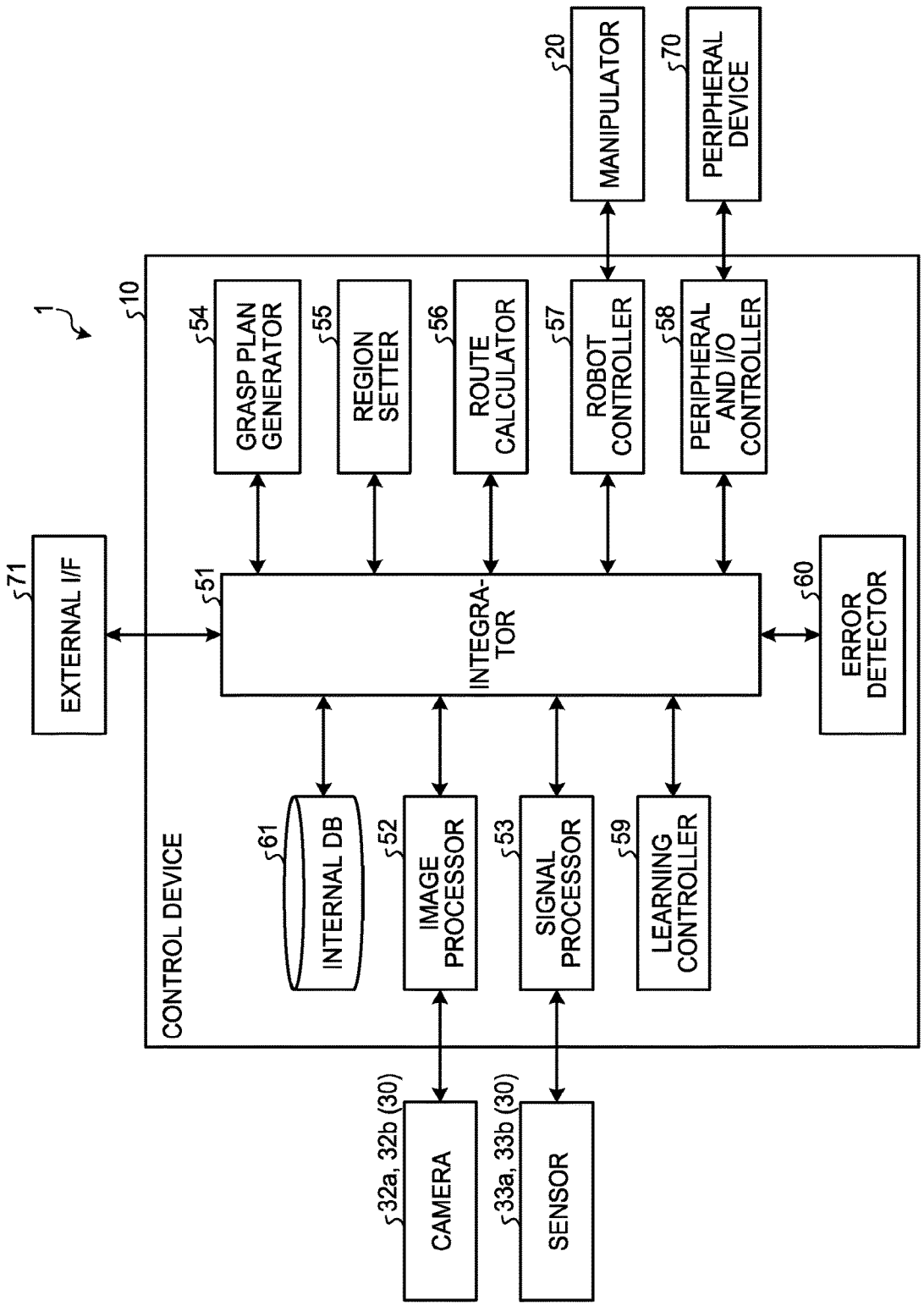
FIG. 2 is an exemplary and schematic configuration block diagram of the object handling system including an object handling device according to the embodiment.

FIG. 2 is an exemplary and schematic configuration block diagram of the object handling system 1 including the object handling device of the embodiment, mainly illustrating the schematic configuration of the control device 10. The control device 10 serves as one or more processors and includes, for example, an integrator 51, an image processor 52, a signal processor 53, a grasp plan generator 54, a region setter 55, a route calculator 56, a robot controller (motion controller), a peripheral and input/output (I/O) controller 58, a learning controller 59, an error detector 60, and an internal database (DB) 61.

The integrator 51 serves to generate, operate, and manage a work plan of the object handling system 1 on the basis of user input information from an external interface (I/F) 71, the state of the object handling system 1, and the detected value of the sensor 30.

The image processor 52 receives and processes images from the cameras 32a and 32b serving as the sensor 30 to generate information used in motion planning, motion control, error detection, and learning.

The signal processor 53 receives and processes information, i.e., detected values from the laser range scanners 33a and 33b serving as the sensor, to generate information used in motion planning, motion control, and error detection. The image processor 52 and the signal processor 53 are examples of an information acquirer.

The grasp plan generator 54 calculates a grasping method and a grasping pose of the object OBJ at the initial position HP, and a moving route and via points along which the manipulator 20 or hand 22 is moved to the initial position HP. The grasp plan generator 54 also calculates a moving route and via points of the hand 22 to grasp a next intended object OBJ after releasing the object OBJ at the moving destination RP. In these cases, the object information acquired by the camera 32a is utilized in calculation of the moving route and via points to move the hand 22 without interfering with surrounding obstacles such as wall surfaces of the containers 14a and 14b or an object or objects other than the currently moved object OBJ.

To move the hand 22 grasping the object OBJ from the initial position HP to the moving destination RP, the region setter 55 sets regions in a space between the initial position HP and the moving destination RP with reference to the object information and the status information acquired by the cameras 32a and 32b and the laser range scanners 33a and 33b. The region setter 55 sets a first region, a second region, and a third region, for example. In the first region the hand 22 is allowed to move without being restricted by obstacles such as the containers 14a and 14b and a previously set object in the space between the initial position HP and the moving destination RP. In the second region the hand 22 is restricted from moving due to presence of obstacles. At least part of the third region is set below the second region, and in the third region the hand 22 is moved under force control. In the first region the hand 22 is movable at a higher speed, for example. In the second region the hand 22 is restricted or prohibited from passing. In the third region the force sensor 31 detects force, allowing the hand 22 to correct the moving route under repulsive control if the object OBJ or the hand 22 interferes with the obstacle. Additionally, in the third region, the moving speed of the hand 22 (object OBJ) may be lowered, or the force sensor 31 may be temporarily improved in terms of sensing accuracy, for example.

The above force control includes pressing control and repulsive control. The region setter 55 can set part of the third region as a subject of the pressing control of the force control and set the rest thereof as a subject of the repulsive control of the force control. In this case, in the region subjected to the pressing control, the hand 22 may be generally restricted or prohibited as in the second region, and the object OBJ and the hand 22 may be allowed to pass therethrough under exceptional pressing control.

The route calculator 56 calculates the moving route of the object OBJ from the initial position HP to the moving destination RP with reference to the first region, the second region, and the third region. For example, the route calculator 56 calculates the moving route including a moving method and a speed of the hand 22 to smoothly move the grasped object OBJ from the initial position HP to the moving destination RP. Setting the first region, the second region, and the third region and switching the behavior of the hand 22 moving along the moving route among the regions makes it possible to efficiently move or convey the object OBJ at a higher speed while lowering a risk of interfering with the obstacles. Setting the first region, the second region, and the third region, and moving the hand 22 or object OBJ in the regions will be described in detail later.

The robot controller 57 serves to control speed, orientation, and pose of motion of the manipulator 20 including the hand 22 so as to move the hand 22 grasping the object OBJ along the moving route.

The peripheral and I/O controller 58 controls inputs and outputs for controlling various conveyance devices and a peripheral device 70 such as a safety door, acquiring various kinds of sensor information, and controlling lighting.

The learning controller 59 controls a learning function of the object handling device including robot model learning for improving the accuracy of motion of the manipulator 20 such as vibration suppression, grasping control parameter learning and grasp database learning for improving capability to grasp the object OBJ, and error detection learning for improving feasibility of a work plan. In the embodiment, the learning controller 59 selects an optimum parameter value in the force control, depending on a situation. The operator may empirically set such values, however, applying results of machine learning enables more efficient processing with work saving.

The error detector 60 monitors a state of the object handling system 1, progress of a work plan, a controlled state of the system 1, a state of the object OBJ while grasped, moved, or conveyed for error detection. The error detector 60 can implement this error detection, for example, by monitoring a fingertip coordinate value of the hand 22a to determine error when the value exceeds a predefined value. The fingertip coordinate value is converted from an output of the force sensor 31 and passes through a low-pass filter. As a result, the object handling system 1 can interrupt the work in progress and proceed to a recovery operation.

The internal database (DB) 61 contains, for example, a robot database, a hand database, an article database, a grasp database, and an environment database, none of which are illustrated.

The robot database (DB) stores, for example, the structure of the object handling system 1, dimensions and weights and moment of inertia of the respective elements, an operational range, speed, and torque performance of each driver.

The hand database (DB) stores, for example, functions of the hand 22 and information as to grasping characteristics of the hand 22.

The article database (DB) stores, for example, various kinds of information on the object OBJ such as a name, an identification number, a category, image information of the entire surface, CAD model information, weight information, and grasping characteristic information (e.g., soft, fragile, or deformable). In the embodiment, the objects OBJ have different shapes and sizes, and are introduced into the initial position HP in a mixed state. Densely arranging the mixed objects OBJ at the moving destination RP can increase the amount of the objects OBJ to be accommodated in the container 14b at a time, and enhance the efficiency of physical distribution.

The grasp database (DB) stores, as to the object OBJ, score information such as graspable position and pose, and capability to grasp, a possible pressing amount at the time of grasping, a grasp determination threshold, and a determination threshold for error detection for each grasping method of the hand 22, for example. Examples of the grasping method include suctioning, parallel two-finger method, parallel four-finger method, and multi-joint method.

The environment database (DB) stores, for example, workbench information compatible with the object handling system 1 and surrounding information representing an operational range of the object handling system 1 and surrounding obstacles.

The external I/F 71 serves to transmit and receive data between the integrator 51 (control device 10) and an external apparatus (not illustrated).

Schematic Control and Operation of Object Handling System or Device

The object handling system 1 operates in accordance with a moving work plan for all of the objects OBJ provided from a high-order system via the external I/F 71.

Figure 3:
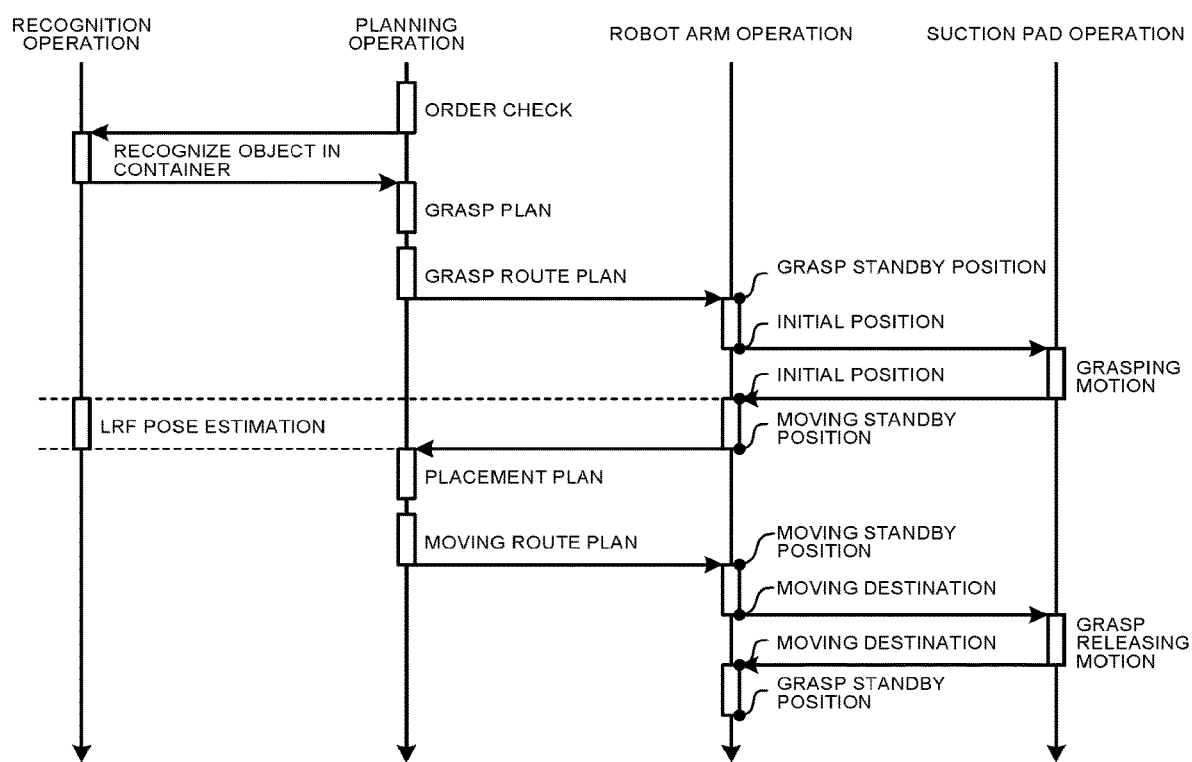
FIG. 3 is an exemplary and schematic flowchart of the overall operation of the object handling system including the object handling device of the embodiment.

FIG. 3 illustrates the overall operational flow of the object handling system 1. The operation of the object handling system 1 or object handling device is generally sorted into a planning operation, a recognition operation, a robot arm operation (moving), and a suction pad operation (grasping).

First, the integrator 51 performs an order check with reference to a moving work plan instructed by the high-order system, as the planning operation. In this case, the camera 32a recognizes the objects OBJ in the container 14a at the initial position HP, and the camera 32b recognizes previously set objects in the container 14b at the moving destination RP to acquire the object information and the status information. The grasp plan generator 54 then generates a grasp plan including the order of grasping the objects OBJ. The grasp plan generator 54 also generates a plan of a moving or grasping route to the object OBJ. As the robot arm operation, the robot controller 57 moves the hand 22 from a grasp standby position (home position) to the initial position HP along the generated grasp route. The robot controller 57 causes the hand 22 or the suction pad 22a to grasp the object OBJ at the grasp position by the suction pad operation. The robot controller 57 causes the hand 22 grasping the object OBJ to move to a moving standby position (for example, in the measuring regions of the laser range scanners 33a and 33b), and causes, while the hand is moving, the laser range scanners 33a and 33b (for example, LRFs) to estimate the pose of the object OBJ including a size and a grasping pose, as the recognition operation.

As the planning operation, the region setter 55 sets the first region, the second region, and the third region on the basis of the object information and the status information acquired by the recognition operation, and the route calculator 56 generates a moving-route plan for the hand 22 grasping the object OBJ to place the object OBJ.

As the robot arm operation, the robot controller 57 then causes the hand 22 grasping the object OBJ at the moving standby position to move to the moving destination RP along the moving route. As the suction pad operation, the robot controller 57 releases the suction pad 22a from grasping at the moving destination RP, and sets the object OBJ at the moving destination RP. Then, the robot controller 57 causes the hand 22 having released the object OBJ to return to the grasp standby position, and completes a series of motions, transfers, or placement of the object OBJ, and repeatedly performs the operations to move a next object OBJ.

Outline of Object Placement Plan

Figure 4:
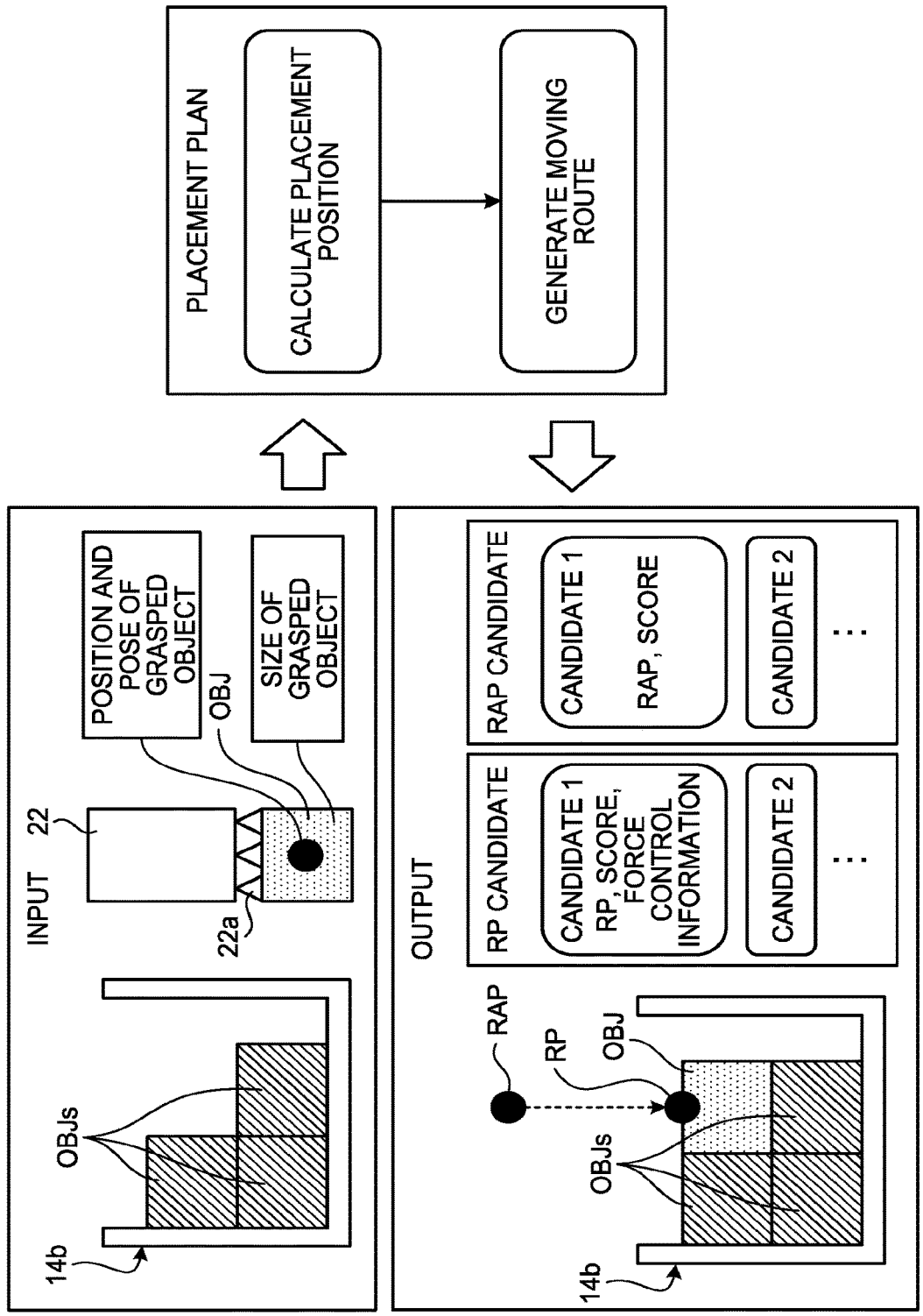
FIG. 4 is an exemplary and schematic explanatory diagram for input/output of an object placement plan in the object handling device of the embodiment.
Figure 5:
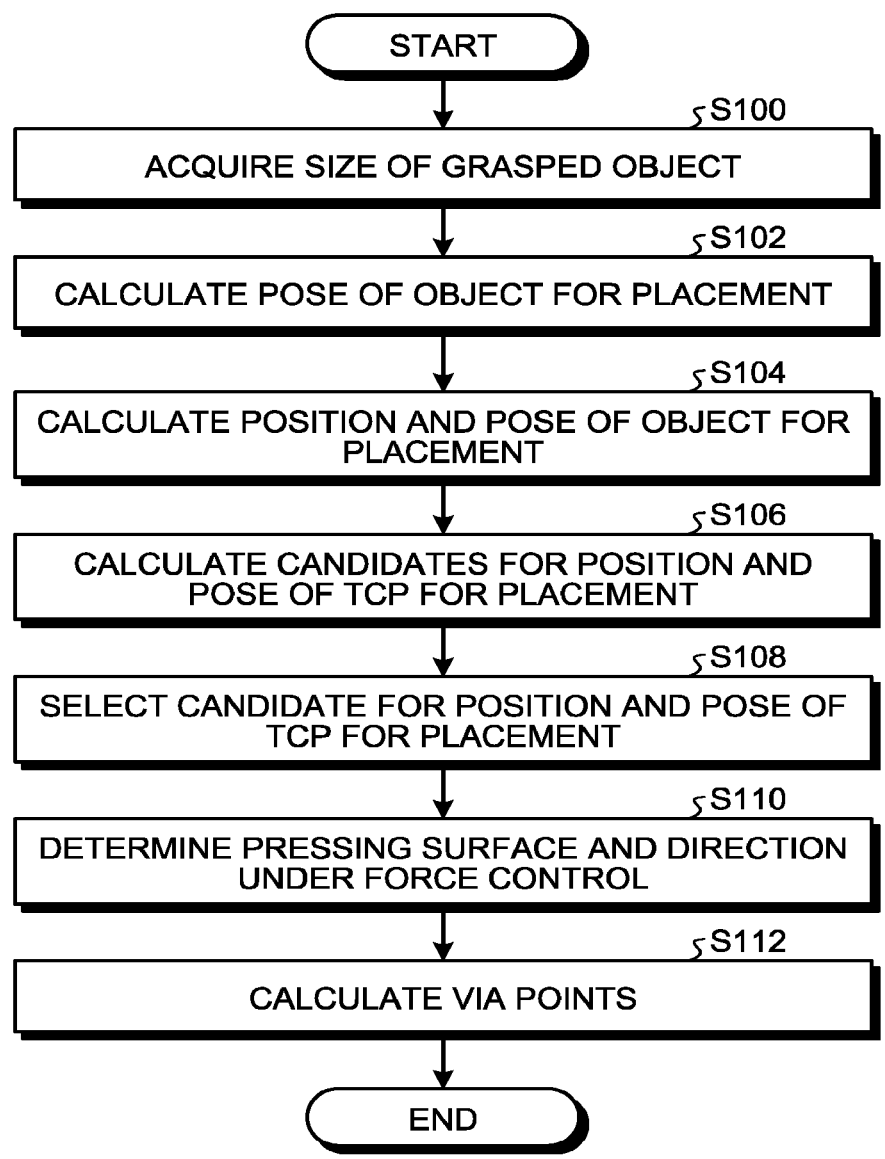
FIG. 5 is an exemplary flowchart of the object placement plan by the object handling device according to the embodiment.

FIG. 4 is an exemplary and schematic explanatory diagram for input and output of a moving or placement plan for the object OBJ in the object handling system 1 or the object handling device. FIG. 5 is an exemplary flowchart for planning the placement of the object OBJ.

To create the placement plan, for example, the route calculator 56 acquires, from the camera 32a and the laser range scanners 33a and 33b, input information including the grasping pose and the size of the object OBJ currently grasped by the hand 22 or suction pad 22a and to be moved and placed at the moving destination RP (container 14b) (S100). Subsequently, the route calculator 56 calculates the pose of the currently grasped object OBJ to place the object OBJ in the container 14b in accordance with the grasping pose and the size of the object OBJ (S102). The route calculator 56 calculates a placeable position and a pose of the grasped object OBJ, that is, a candidate for the moving destination RP on the basis of the status information of previously set objects OBJs in the container 14b (S104). The route calculator 56 calculates a plurality of patterns of position and pose candidates of a fingertip TCP of the hand 22 in placing the object OBJ, on the basis of information on the previously set object OBJs in the container 14b (S106), and selects an optimal position and pose candidate from the patterns (S108). The route calculator 56 also sets information including a target force value, a position of a pressing surface, and a pressing direction used in the force control by the manipulator 20 (hand 22) during movement or placement (S110). The route calculator 56 calculates via points (via position and pose RAP) on the moving route of the object OBJ from the size and the grasping pose of the object OBJ, a state of the previously set objects OBJs, the position and pose of the fingertip TCP at the time of placing the object OBJ (S112). The moving destination RP and the via position and pose RAP calculated as the candidates are associated with scores such as preset priority, and the route calculator 56 selects an optimum moving destination RP and via position and pose RAP according to the scores. After the route calculator 56 succeeds in generating the moving route not to interfere with obstacles such as the previously set objects OBJs or the container 14b, the robot controller 57 causes the manipulator 20 to operate.

In the embodiment, the position and pose of the object OBJ or the hand 22 is represented by a homogeneous transformation matrix T of four rows and four columns. For example, a position and pose $^{W}T_{RP}$ of the moving destination RP is represented by the following Expression 1:

$$^{W}T_{RP} = \begin{bmatrix} ^{W}R_{RP} & ^{W}t_{RP} \\ 0 & 1 \end{bmatrix} = \begin{bmatrix} R_{11} & R_{12} & R_{13} & ^{W}x_{RP} \\ R_{21} & R_{22} & R_{23} & ^{W}y_{RP} \\ R_{31} & R_{32} & R_{33} & ^{W}z_{RP} \\ 0 & 0 & 0 & 1 \end{bmatrix} \quad \text{(Expression 1)}$$

where upper left symbols represent a coordinate system before transformation, lower right subscripts represent a coordinate system after transformation, R represents a three-row, three-column rotation matrix of the pose, t represents a three-row, one-column translation vector of the position, and W represents a world coordinate system of the moving destination RP.

In coordinate transformation, the following Expression 2 holds:

$$^{U}T_{V} = {}^{U}T_{S}{}^{S}T_{V}. \quad \text{(Expression 2)}$$

where S, U, and V each represent an optional coordinate system.

Expression 3 also holds as follows:

$$A = \begin{bmatrix} A_{11} & \cdots & A_{1n} \\ \vdots & \ddots & \vdots \\ A_{m1} & \cdots & A_{mn} \end{bmatrix} \quad \text{(Expression 3)}$$

$$A(i, j) = A_{i,j}, A(i, :) = [A_{i1} \cdots A_{in}],$$

$$A(:, j) = [A_{1j} \cdots A_{mj}]^{T}$$

where A represents a matrix, A(i, j) represents an operation of extracting an element of the i-th row and the j-th column, and A(i, :) and A(:, j) represent operations of extracting a i-th row vector and a j-th column vector, respectively.

Similarly, the following Expression 4 holds:

$$u = [u_1 \cdots u_n]_T, u(i) = u_i \quad \text{(Expression 4)}$$

where u represents a vector and u(i) represents an operation of extracting the i-th element from the vector.

In the embodiment, a rectangular parallelepiped region is represented by Expression 5, similar to the coordinate system and size of the object:

$$^{U}T_{Area} = \begin{bmatrix} ^{U}R_{Area} & ^{U}t_{Area} \\ 0 & 1 \end{bmatrix} = \begin{bmatrix} R_{11} & R_{12} & R_{13} & ^{U}x_{Area} \\ R_{21} & R_{22} & R_{23} & ^{U}y_{Area} \\ R_{31} & R_{32} & R_{33} & ^{U}z_{Area} \\ 0 & 0 & 0 & 1 \end{bmatrix} \quad \text{(Expression 5)}$$

$$^{U}S_{Area} = [sx \quad sy \quad sz]^{T}$$

where $^{U}T_{Area}$ represents a coordinate system of the centroid position and a vector $^{U}S_{Area}$ represents a size thereof.

Figure 6:
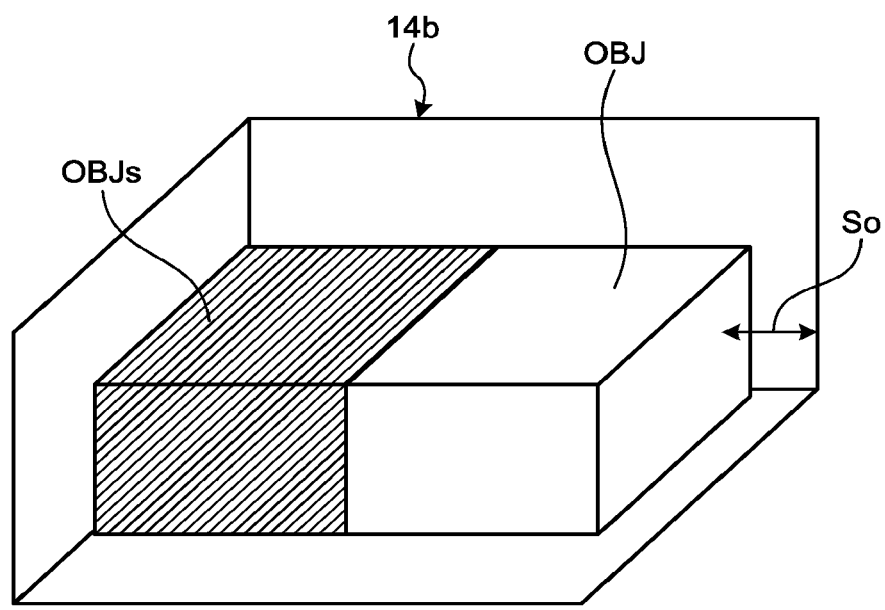
FIG. 6 is a schematic diagram illustrating an exemplary object placement for improving packing density in a narrow space between objects and a container wall at a moving destination in the case of moving, arranging, or packing objects by the object handling device of the embodiment.
Figure 7:
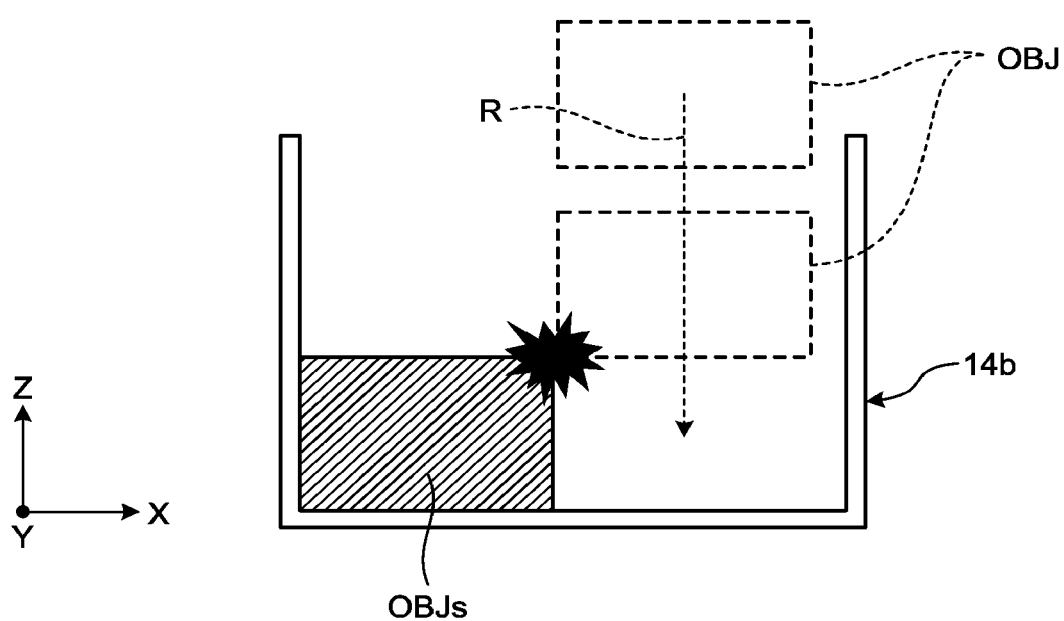
FIG. 7 is an exemplary and schematic explanatory diagram for the situation that a grasped object may collide with a container being a moving destination or a previously moved object in a narrow space.

The object handling system 1 or object handling device is intended to move and arrange the objects OBJ as many as possible in the container 14b being a moving destination. That is, packing density is to be improved. With an improved packing density, the object handling system 1 can reduce the number of containers 14b for shipment, contributing to reduction in transportation cost. The object handling system 1 is likely to increase the packing density by arranging the objects OBJ in a small space So, as illustrated in FIG. 6. In the small space So, however, the object OBJ grasped by the hand 22 may be likely to collide with the previously set object OBJs in the container 14b, as illustrated in FIG. 7. Specifically, large error may occur in measurements by the laser range scanners 33a and 33b or measurements of the previously set object OBJs in the container 14b by a three-dimensional sensor such as the camera 32b. In such a case the object OBJ to set is highly likely to collide with an obstacle along a moving route R, for example. Collision between the object OBJ and the obstacle may cause the object OBJ or the hand 22 or the manipulator 20 to be damaged.

To avoid such a collision, for example, the size of the object OBJ can be set to a larger value including a margin than an actual size at the time of calculating the placement position or the moving route. Setting a uniform large margin may however make it difficult to generate or set up a placement plan of the object OBJ in a small space in the container 14b.

Figure 8:
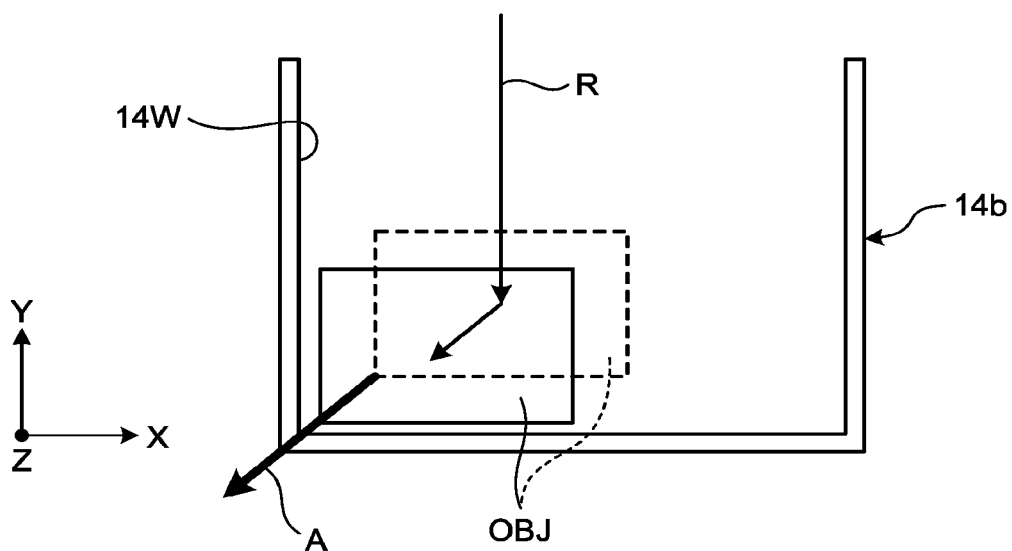
FIG. 8 is an exemplary and schematic explanatory diagram illustrating a pressing control by the object handling device of the embodiment, moving an object while pressing the object against a container wall being a moving destination or a previously set object under force control.
Figure 9:
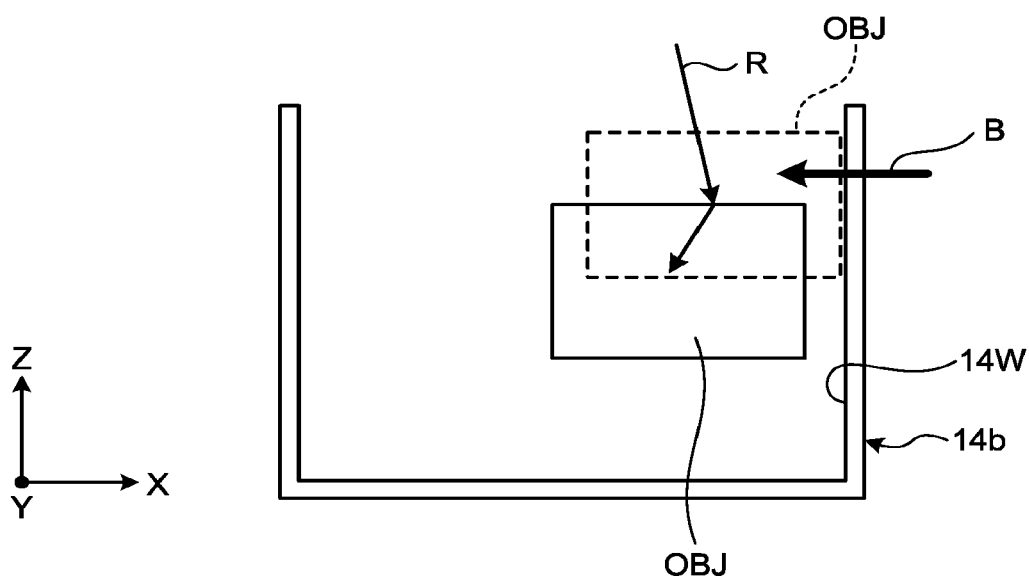
FIG. 9 is an exemplary and schematic explanatory diagram illustrating a repulsive force control by the object handling device of the embodiment over a hand or an object interfering with a container wall being a moving destination or a side surface of a previously set object.

In view of this, in the embodiment, the object handling system 1 or object handling device performs the pressing control and the repulsive control under the force control to effectively utilize a small space. As illustrated in FIG. 1, the hand 22 of the object handling system 1 is equipped with the six-axis force sensor 31. As illustrated in FIG. 8, thus, the hand 22 can move the object OBJ along the moving route R and place the object OBJ in the container 14b while pressing it against a wall 14W or another object OBJs in the direction of arrow A under the force control. This can decrease the gap between the objects by pressing or the pressing control, improving the packing density. As illustrated in FIG. 9, the hand 22 can be controlled to move oppositely in the direction of arrow B (repulsive motion) by the force control when the hand 22 or the object OBJ interferes with the wall 14W of the container 14b or a side surface of the previously set object OBJs while moving along the moving route R. In the following embodiment, the object handling system 1 can eliminate large error in a measured value used in setting up a placement plan or a route plan by the force control as described above, and plan the moving route for placing the object OBJ in a small space.

To efficiently calculate the moving route for moving and placing the object OBJ, the object handling system 1 of the embodiment sorts out possible interference with the obstacle, such as the wall 14W of the container 14b or the previously set object OBJs, into vertical interference and horizontal interference. Vertical Interference refers to interference between the bottom of the object OBJ and the top surface of the previously set object OBJs or the top end of the container 14b as a moving destination in the case of moving the object OBJ in the direction of arrow R, referring to the upper drawing of FIG. 10. Horizontal interference refers to interference between the side surface of the object OBJ and the side surface of the previously set object OBJs or the wall 14W (inner wall) of the container 14b in the case of moving the object OBJ in the direction of arrow R, referring to the upper drawing of FIG. 11. The object handling system 1 basically operates the hand 22 to move or place the grasped object OBJ from upward to downward, so that the vertical interference means collision of the object OBJ, which is likely to damage the grasped object OBJ or the previously set object OBJs. Meanwhile, the horizontal interference signifies sliding between the contact surfaces, which is unlikely to cause damage of the objects OBJ and OBJs. Thus, by the repulsive motion as above, the hand 22 can continuously move to place the object irrespective of occurrence of interference.

Thus, to move the hand 22 grasping the object OBJ from the initial position HP to the moving destination RP, the region setter 55 of the object handling system 1 of the embodiment classifies the space between the initial position HP and the moving destination RP into the first region, the second region, and the third region with different characteristics.

In the first region the hand 22 is allowed to move without being restricted by obstacles such as the wall 14W of the container 14b or the previously set object in the space between the initial position HP and the moving destination RP.

In the second region the hand 22 is restricted from moving due to presence of obstacles. For example, the hand 22 is restricted from entering or moving from above to below the obstacle. To avoid interference, the fingertip TCP of the hand 22 is prohibited from passing the second region while moving from upward to downward following a moving-route plan. In the second region the hand 22 may be additionally restricted from moving from downward to upward or moving laterally. The second region may be set to a motion prohibited region in which the hand 22 or the object OBJ is prohibited from entering or moving.

At least part of the third region is set below and adjacent to the second region, and includes a first control region and a second control region, for example. In the third region the hand 22 is operated under the force control as described later. In setting the third region below the second region, at least part of the first region may be set between the second region and the third region. The first control region of the third region is set below the second region along the obstacle, and includes a less margin with respect to the obstacle than the second region, that is, has a smaller lateral width than the second region. In the lateral direction the first control region is set entirely adjacent to the bottom of the second region. The hand 22 enters the first control region from the lateral direction with respect to the obstacle. In other words, setting the first control region below the second control region prevents the object OBJ or the hand 22 from approaching the first control region from above the second region. Also, the object OBJ or the hand 22 enters and approaches the inside of the first control region from the lateral direction alone. The first control region is laterally adjacent to the obstacle below the second region, and the hand 22 is operated under the pressing control of the force control therein. As in a second region 100, the hand 22 may be prohibited in principle from moving in or entering the first control region, such as from upward to downward motion. In this case, if such motion or entry prohibition makes it difficult to create the route or a created route is inefficient, the hand 22 may be exceptionally allowed to move in or enter the first control region under the condition that the hand 22 is operated under the pressing control.

The second control region of the third region is adjacent to a side of the first control region opposite to the obstacle, and serves to an entry route to the first control region. At least part of the second control region on the first control region side is located below the second region. Preferably, the entire second control region is located below the second region in the lateral direction. In the second control region the hand 22 is operated under the repulsive control of the force control. That is, in the second control region, the hand 22 is repulsively operated to move away from an interfering obstacle which occurs due to a different actual size of the object OBJ grasped by the hand 22.

In the second control region, behavior of at least the hand 22 may be limited so as to allow the pressing control in the first control region. In this case, the limitation to the behavior of the hand 22 in the second control region refers to, for example, limitation to the moving speed of the hand 22. In the second control region, the moving speed of the hand 22 is set lower than the passing speed in the first region, to allow switching to the pressing control of the force control at appropriate timing, that is, at the time of entering the first control region. Alternatively, the third region may exclude the second control region in which the hand 22 is operated under the repulsive control and it may be entirely set to the first control region in which the hand 22 is operated under the pressing control.

The region setter 55 serves to set the first region, the second region, and the third region including the first control region and the second control region according to the object information and the status information acquired by the cameras 32a and 32b and the laser range scanners 33a and 33b. If there is an overlapping region between the second region and the third region, the region setter 55 gives priority to the third region, and handles the overlapping region as the third region. With an overlapping region between the first control region of the third region and the second region found, the region setter 55 gives priority to the first control region, and handles the overlapping region as the first control region.

Figure 10:
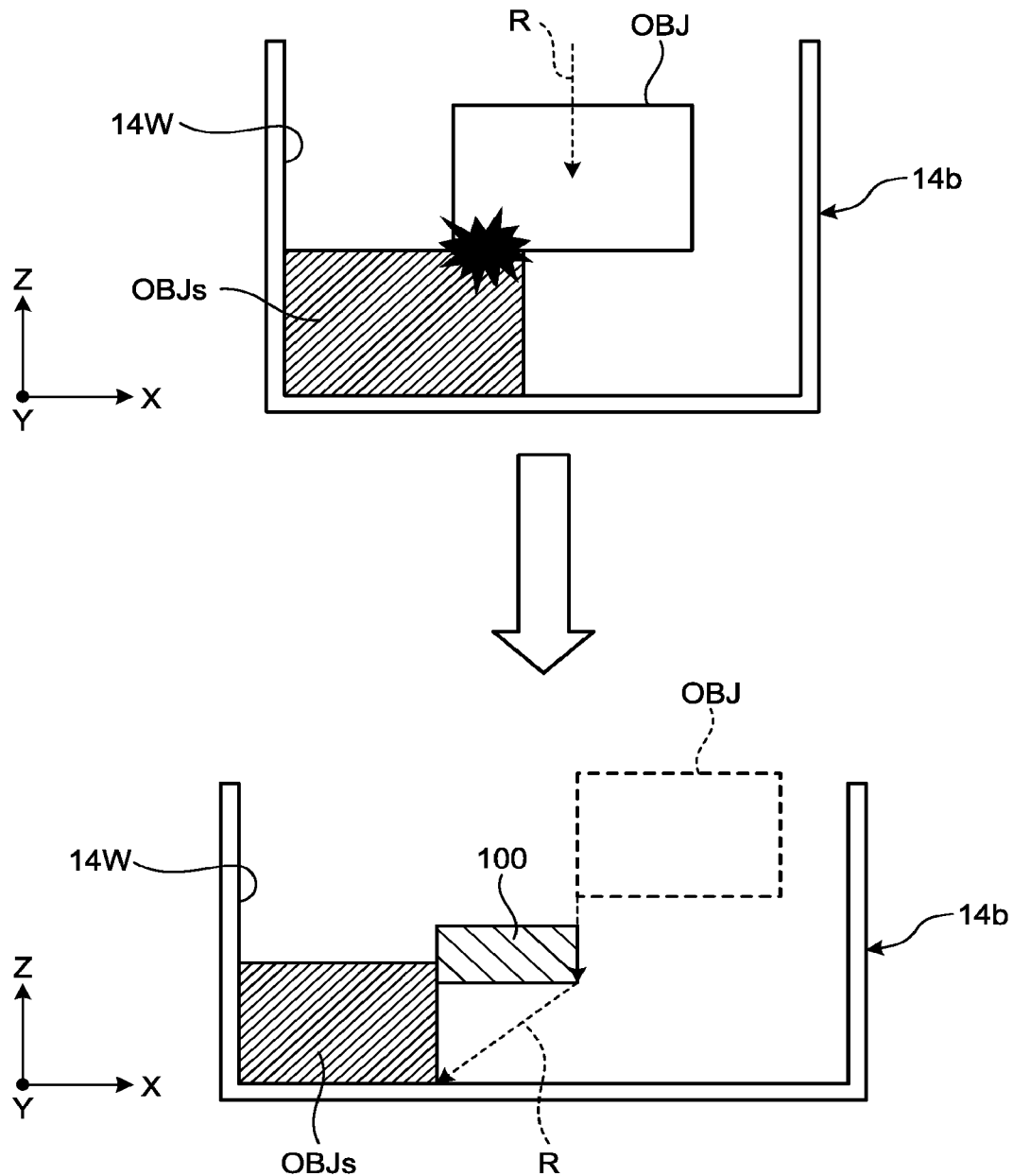
FIG. 10 is an exemplary and schematic explanatory diagram of setting a second region as a motion restricted region with reference to a container wall as a moving destination or an previously set object, to avoid interference in the object handling device of the embodiment.
Figure 11:
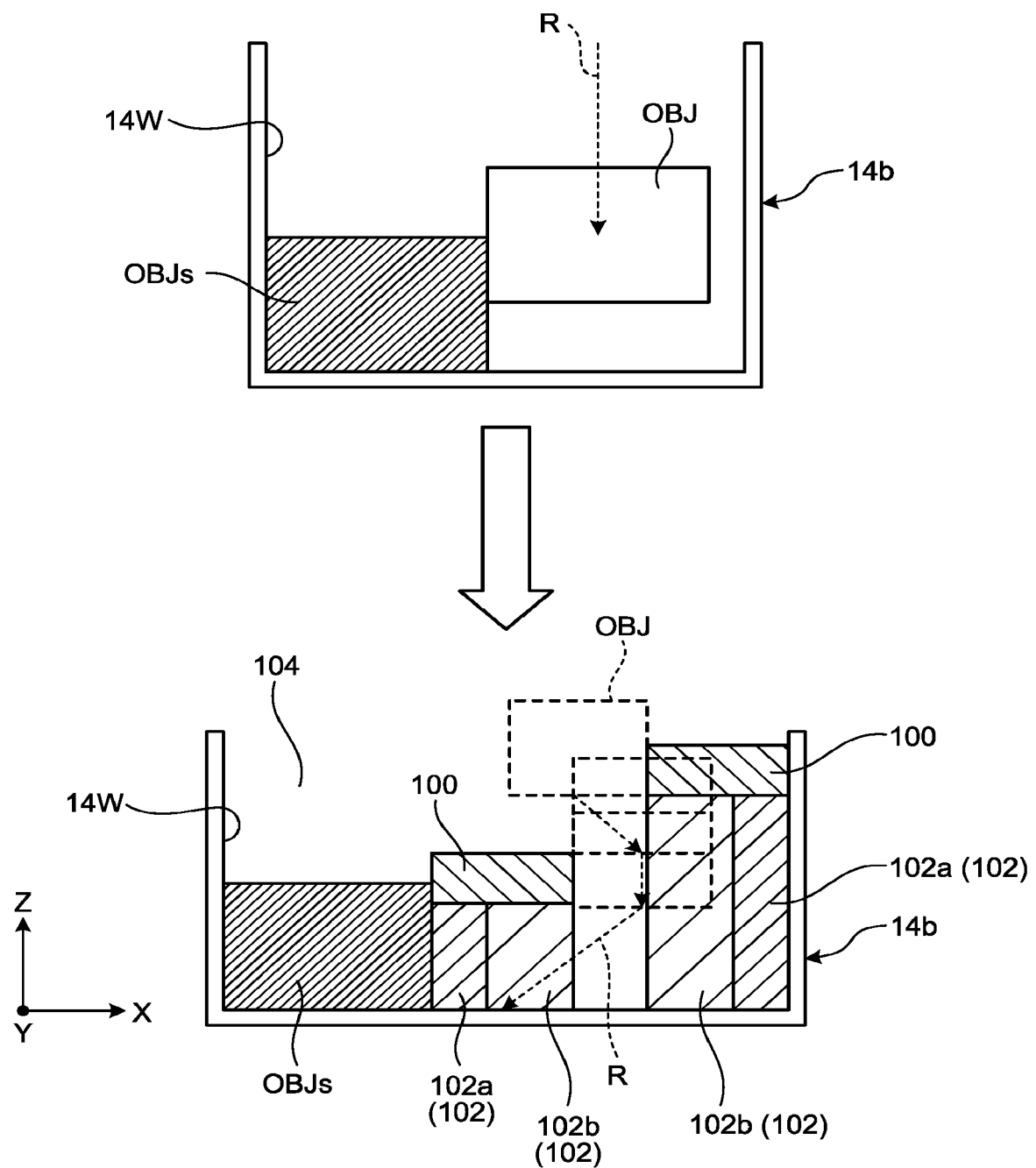
FIG. 11 is an exemplary and schematic explanatory diagram for setting a first region, a second region, and a third region with reference to a container wall as a moving destination or an previously set object to generate the moving route of an object and a hand for avoiding interference in the object handling device according to the embodiment.

For example, when the object OBJ approaches the previously set object OBJs along the wall 14W of the container 14b from above as illustrated in the upper drawing of FIG. 10, the second region 100 is set in the vicinity of the top surface of the previously set object OBJs as illustrated in the lower drawing of FIG. 10. The hand 22 grasping the object OBJ is moved along the moving route R so as not to pass the second region 100, thereby ensuring that the object OBJ is prevented from colliding with the object OBJs. The lower drawing of FIG. 11 illustrates an example of dividing a third region 102 into a first control region 102a and a second control region 102b. In this example, the hand 22 grasping the object OBJ moves along the moving route R without passing through the second region 100 and the first control region 102a, to ensure that the object OBJ is prevented from colliding with the object OBJs. In the lower drawing of FIG. 11, the object OBJ is moved along the moving route R in the X-direction, i.e., not moving from upward to downward, and enters the second region 100 by way of example. Further, in the lower drawing of FIG. 11 the third region 102 including the first control region 102a and the second control region 102b is set adjacent to the bottom of the second region 100, and the region other than the second region 100 and the third region 102 is set to the first region 104. The first region 104 will be described later.

With reference to FIG. 12 to FIG. 23, the following describes setting the second region 100 and the first control region 102a of the third region 102 in detail.

Figure 12:
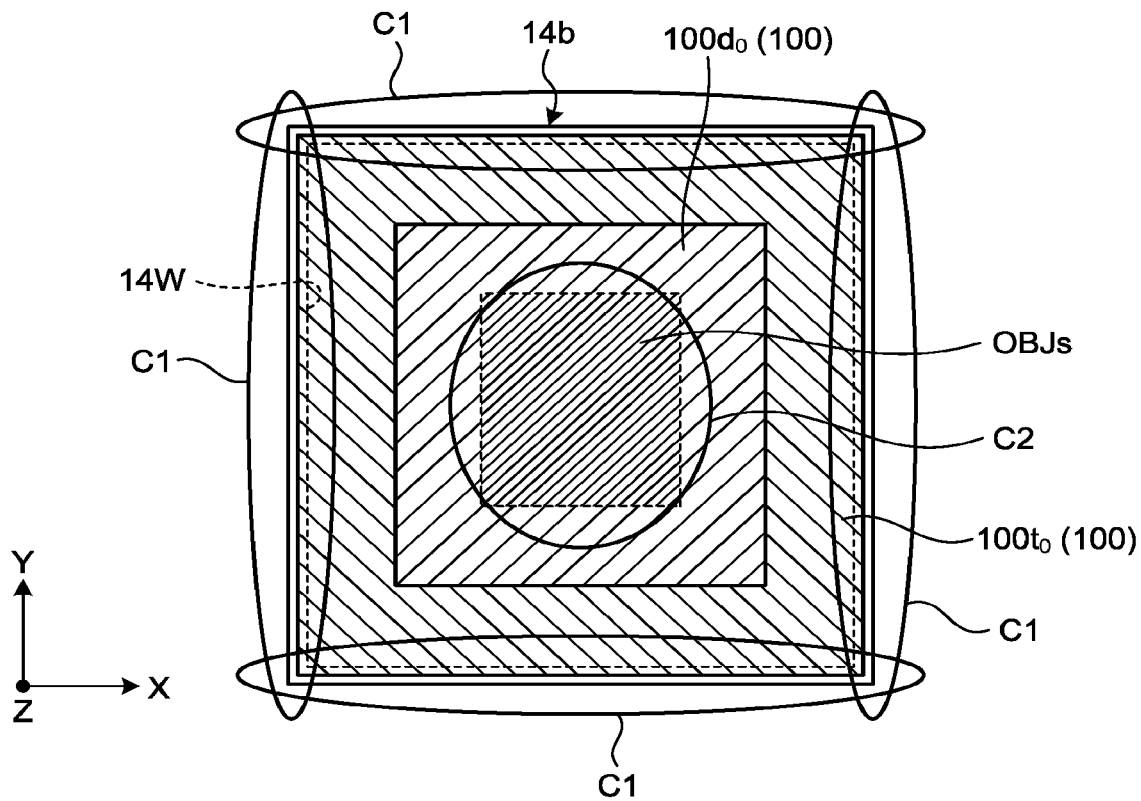
FIG. 12 is a schematic top view of an exemplary second region set in the object handling device of the embodiment.
Figure 13:
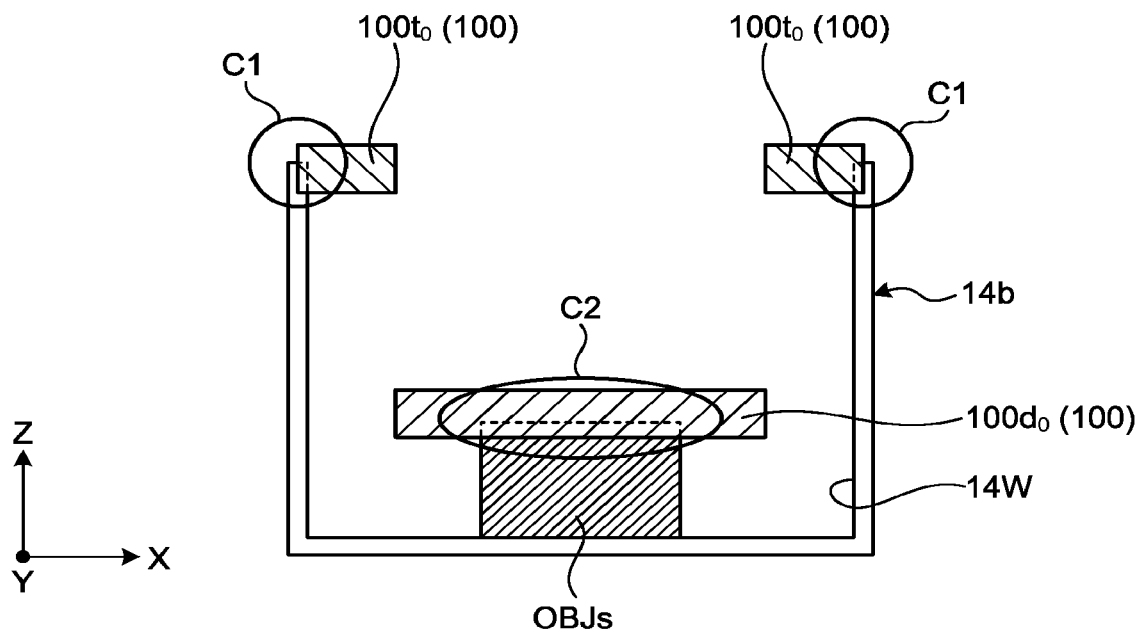
FIG. 13 is a schematic side view of an exemplary second region set in the object handling device according to the embodiment.

First, with reference to FIG. 12 and FIG. 13, the following describes an example of setting a passage restricted region for the fingertip TCP, that is, the second region 100, to avoid vertical interference without considering the size of the grasped object OBJ and the size of the hand 22. That is, the passage restricted region for the fingertip TCP is set on the assumption that the sizes of the grasped object OBJ and the hand 22 be infinitely close to zero. In the top view of the container 14b and the previously set object OBJs in FIG. 12, locations where vertical interference may occur are the wall 14W of the container 14b enclosed by ellipses C1 and the object OBJs enclosed by an ellipse C2. In this case, the second region 100 (second region $100t_0$) for avoiding interference between the bottom of the object OBJ grasped by the hand 22 and the top end of the wall 14W is set inside and along the wall 14W to include a given first margin value $\delta_x$ (X-direction) and first margin value $\delta_y$ (Y-direction). Similarly, on the top surface of the object OBJs, the second region 100 (second region $100d_0$) is set to cover the periphery of the object OBJs, including the given first margin value $\delta_x$ (X-direction) and first margin value $\delta_y$ (Y-direction) with respect to the top end of the object OBJs. FIG. 13 illustrates the position of the ellipse C1 for the wall 14W, the position of the ellipse C2 for the object OBJs, and positions of the second region $100t_0$ set on an upper part of the wall 14W and the second region $100d_0$ set on the top surface of the object OBJs in the side view of the container 14b and the object OBJs in FIG. 12. As illustrated in FIG. 13, the second region $100t_0$ and the second region $100d_0$ include a given first margin value $\delta_z$ along the height, i.e., in Z-direction. The given first margin value $\delta_x$, first margin value $\delta_y$, and first margin value $\delta_z$ are preset through testing, for example.

Specifically, for avoiding vertical interference with each previously set object OBJs, the position and pose $^{TOTE}T_{KeepoutZ,i}$ and size $^{TOTE}S_{KeepoutZ,i}$ of the fingertip TCP in the passage restricted region are calculated by the following Expression 6 and Expression 7:

$$^{TOTE}T_{KeepoutZ,i} = \begin{bmatrix} & & & ^{TOTE}x_{Obstacle,i} \\ & ^{TOTE}R_{Obstacle,i} & & ^{TOTE}y_{Obstacle,i} \\ & & & ^{TOTE}z_{Obstacle,i} + ^{TOTE}sz_{Obstacle,i}/2 \\ 0 & & & 1 \end{bmatrix} \quad \text{(Expression 6)}$$

$$^{TOTE}S_{KeepoutZ,i} = \begin{bmatrix} ^{TOTE}sx_{Obstacle,i} + 2\delta_x & ^{TOTE}sy_{Obstacle,i} + 2\delta_y & 2\delta_z \end{bmatrix}^T \quad \text{(Expression 7)}$$

where $^{TOTE}T_{Obstacle,i}$ represents the position and pose of the previously set object OBJs (i=1, ..., n: n is the number of the objects OBJs), and $^{TOTE}S_{Obstacle,i}$ represents the size thereof.

Figure 14:
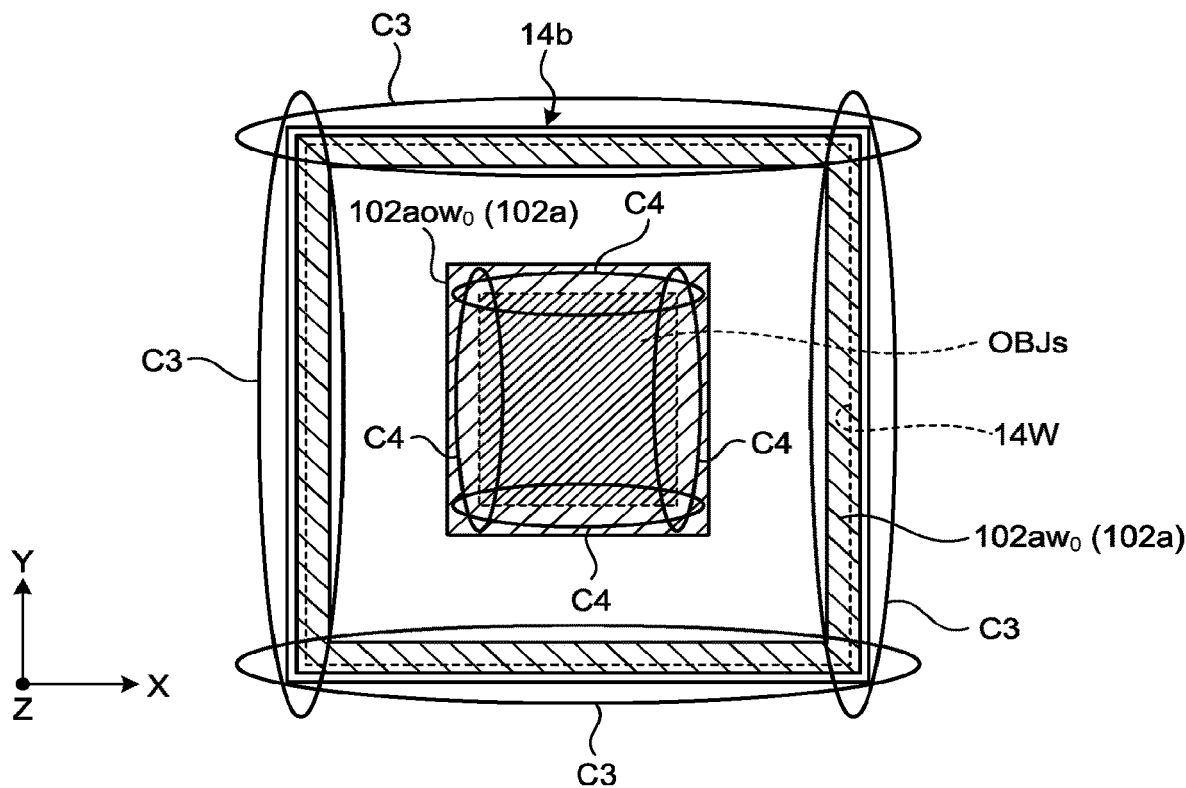
FIG. 14 is a schematic top view of an exemplary first control region of the third region set in the object handling device of the embodiment.
Figure 15:
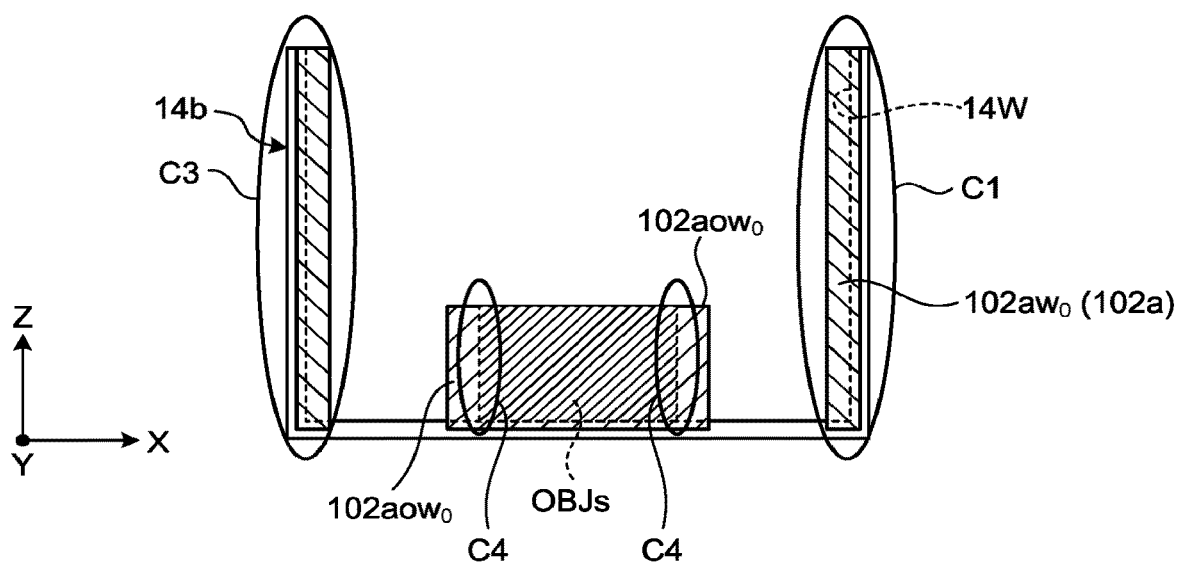
FIG. 15 is a schematic side view of an exemplary first control region of the third region set in the object handling device of the embodiment.

With reference to FIG. 14 and FIG. 15, the following describes an example of setting the passage restricted region for the fingertip TCP, that is, the first control region 102a of the third region 102, without considering the size of the grasped object OBJ and the size of the hand 22, to avoid horizontal interference. In the top view of the container 14b and the previously set object OBJs, locations where horizontal interference may occur are the walls 14W of the container 14b enclosed by an ellipse C3 and the object OBJs enclosed by an ellipse C4. In this case, for avoiding interference between the side surface of the object OBJ grasped by the hand 22 and the inner surfaces of the walls 14W, the first control region 102a (first control region $102aw_0$ is set inside and along the walls 14W with given second margin value $\varepsilon_x$ (X-direction) and second margin value $\varepsilon_y$ (Y-direction). Similarly, on the outer surface of the object OBJs, the first control region 102a (first control region $102aow_0$) is set to cover the side surface of the object OBJs with the given second margin value $\varepsilon_x$ (X-direction) and second margin value $\varepsilon_y$ (Y-direction) with respect to the outer surface of the object OBJs. FIG. 15 illustrates a position of the ellipse C3 for the wall 14W, a position of the ellipse C4 for the object OBJs, and positions of the first control region $102aw_0$ set on the inner surface of the wall 14W and the first control region $102aow_0$ set on the outer surface of the object OBJs in the side view of the container 14b and the object OBJs in FIG. 14. As illustrated in FIG. 15, the first control region $102aw_0$ and the first control region $102aow_0$ are set to include a given second margin value $\varepsilon_z$ along the height, i.e., in the Z-direction. The given second margin value $\varepsilon_x$, second margin value $\varepsilon_y$, and second margin value $\varepsilon_z$ are preset smaller than the first margin value $\delta_x$, the first margin value $\delta_y$, and the first margin value $\partial_z$ through testing.

Specifically, for avoiding horizontal interference with each previously set object OBJs, the position and pose $^{TOTE}T_{KeepoutXY,i,j}$ and the size $^{TOTE}S_{KeepoutXY,i,j}$ of the fingertip TCP in the passage restricted region are calculated by the following Expression 8 and Expression 9:

$$^{TOTE}T_{KeepoutXY,i,j} = \begin{bmatrix} ^{TOTE}R_{Obstacle,i} & ^{TOTE}x_{Obstacle,i} + \Delta x \\ & ^{TOTE}y_{Obstacle,i} + \Delta y \\ & ^{TOTE}z_{Obstacle,i} \\ 0 & 1 \end{bmatrix} \quad \text{(Expression 8)}$$

$$\Delta x = \begin{cases} ^{TOTE}sx_{Obstacle,i}/2 + \varepsilon_x/2 & \text{if } j = 3 \\ -(^{TOTE}sx_{Obstacle,i}/2 + \varepsilon_x/2) & \text{if } j = 4 \\ 0 & \text{if } j = 1, 2 \end{cases}$$

$$\Delta y = \begin{cases} ^{TOTE}sy_{Obstacle,i}/2 + \varepsilon_y/2 & \text{if } j = 1 \\ -(^{TOTE}sy_{Obstacle,i}/2 + \varepsilon_y/2) & \text{if } j = 2 \\ 0 & \text{if } j = 3, 4 \end{cases}$$

$$^{TOTE}S_{KeepoutXY,i,1} = \quad \text{(Expression 9)}$$
$$\begin{bmatrix} \varepsilon_x & ^{TOTE}sy_{Obstacle,i} + 2\varepsilon_y & ^{TOTE}sz_{Obstacle,i} + 2\varepsilon_z \end{bmatrix}^T$$

$$^{TOTE}S_{KeepoutXY,i,2} =$$
$$\begin{bmatrix} \varepsilon_x & ^{TOTE}sy_{Obstacle,i} + 2\varepsilon_y & ^{TOTE}sz_{Obstacle,i} + 2\varepsilon_z \end{bmatrix}^T$$

$$^{TOTE}S_{KeepoutXY,i,3} =$$
$$\begin{bmatrix} ^{TOTE}sx_{Obstacle,i} + 2\varepsilon_x & \varepsilon_y & ^{TOTE}sz_{Obstacle,i} + 2\varepsilon_z \end{bmatrix}^T$$

$$^{TOTE}S_{KeepoutXY,i,4} =$$
$$\begin{bmatrix} ^{TOTE}sx_{Obstacle,i} + 2\varepsilon_x & \varepsilon_y & ^{TOTE}sz_{Obstacle,i} + 2\varepsilon_z \end{bmatrix}^T$$

where $^{TOTE}T_{Obstacle,i}$ represents the position and pose of the previously set object OBJs (i=1, n: n is the number of the objects OBJs), $^{TOTE}S_{Obstacle,i}$ represents the size thereof and j=1, 2, 3, and 4 where the value of j indicates ±X-direction and ±Y-direction.

As described above, the object OBJ horizontally approaching can be regarded as being less likely to interfere with the obstacle than the object OBJ vertically approaching. Thus, the respective margin values can be set such that $\delta_x > \varepsilon_x$, $\delta_y > \varepsilon_y$, and $\delta_z > \varepsilon_z$.

Subsequently, the second region 100 is calculated, considering the position and the size of the grasped object OBJ.

Figure 16:
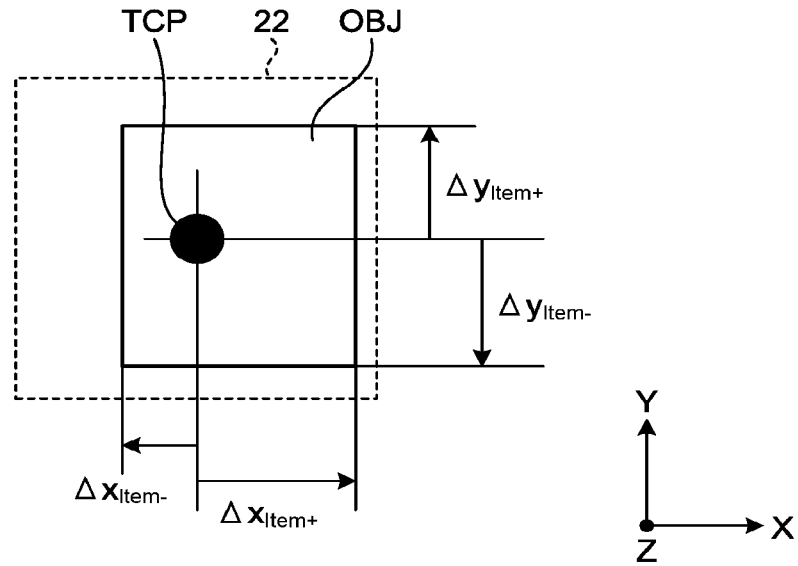
FIG. 16 is an exemplary and schematic top view for explaining an assumed value of an object in setting the second region, considering the size of the object grasped by the hand in the object handling device of the embodiment.
Figure 17:
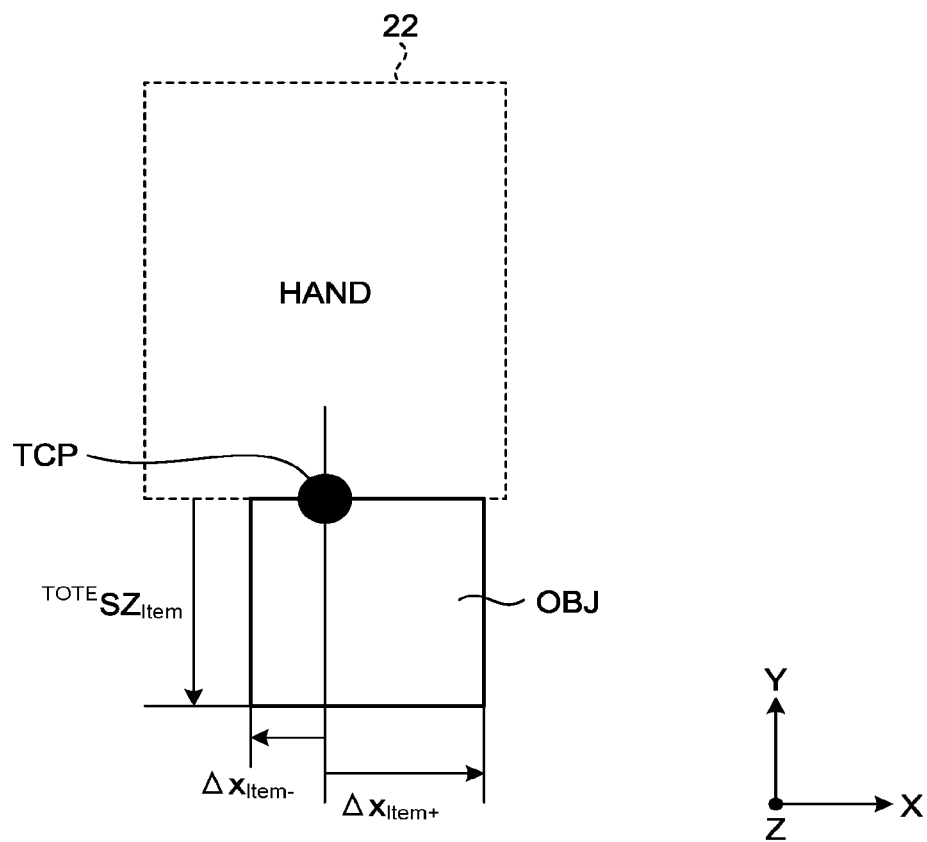
FIG. 17 is an exemplary and schematic side view for explaining an assumed value of an object in setting the second region, considering the size of the object grasped by the hand in the object handling device of the embodiment.
Figure 18:
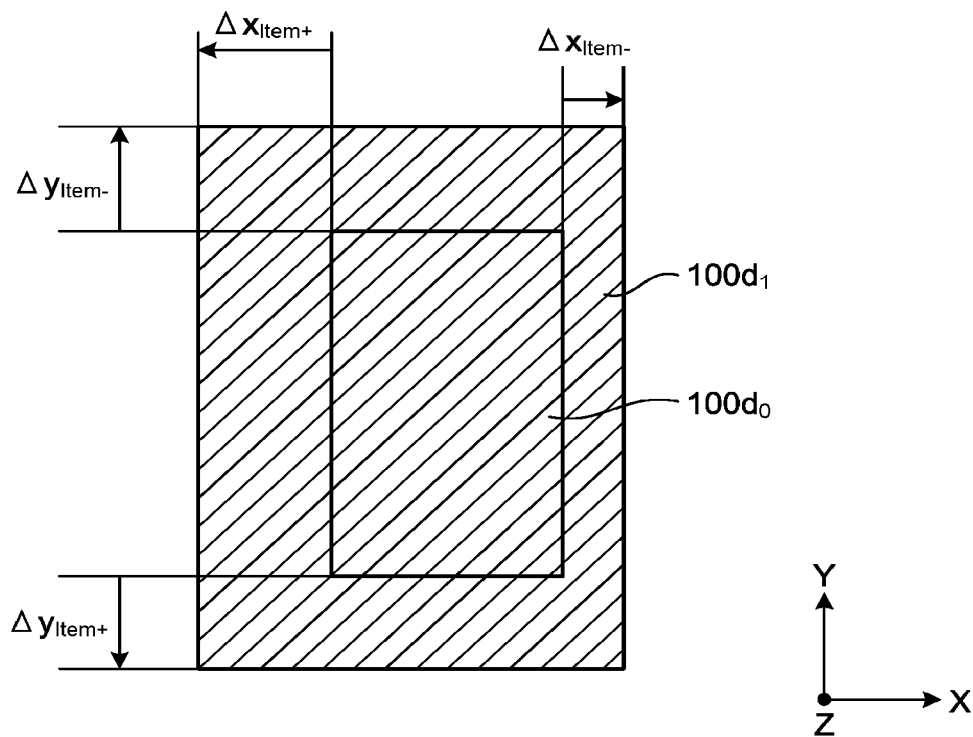
FIG. 18 is an exemplary and schematic top view for setting the second region, considering the size of the object grasped by the hand in the object handling device of the embodiment.
Figure 19:
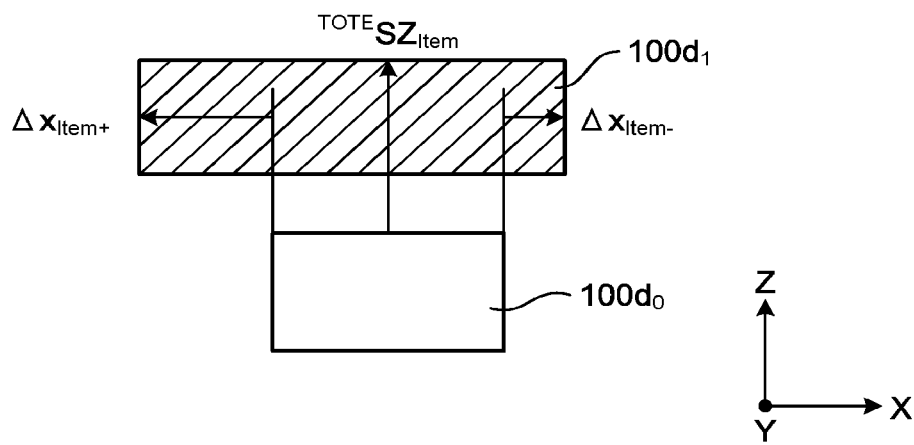
FIG. 19 is an exemplary and schematic side view for setting the second region, considering the size of an object grasped by the hand in the object handling device of the embodiment.

First, as illustrated in FIG. 16, distances (reflecting the position and the size) from the fingertip TCP of the hand 22 grasping the object OBJ to the X- and Y-directional end faces of the object OBJ are defined as $\Delta x_{Item-}$, $\Delta x_{Item+}$, $\Delta y_{Item-}$, and $\Delta y_{Item+}$. As illustrated in FIG. 17, a Z-directional distance (reflecting the position and the size) from the fingertip TCP of the hand 22 to the bottom of the object OBJ is defined as $^{TOTE}SZ_{Item}$.

In this case, as to vertical interference, the bottom of the grasped object OBJ interfering with the obstacle matters. Regarding horizontal interference, when the bottom of the object OBJ is not interfering with the obstacle, the side surfaces can be regarded as not interfering with the obstacle. That is, the second region 100 can be set, considering the position and the size of the bottom of the object OBJ alone. Thus, as to the second region 100 considering the position and the size of the grasped object OBJ, a second region $100d_1$ can be calculated in the X and Y directions by widening the margin of the second region $100d_0$, not reflecting the sizes of the grasped object OBJ and the hand 22, by $\Delta x_{Item-}$ and $\Delta x_{Item+}$ in the X-direction and by $\Delta y_{Item-}$ and $\Delta y_{Item+}$ in the Y-direction in the top view of FIG. 18. Similarly, in the side view of FIG. 19, the second region $100d_1$ reflecting the position and the size of the object OBJ can be calculated in the Z-direction by widening the margin of the second region $100d_0$ upward by $^{TOTE}SZ_{Item}$.

The position and pose $^{TOTE}T_{KeepoutItem,i}$ and the size $^{TOTE}S_{KeepoutItem,i}$ of the second region 100, reflecting the grasped object OBJ, through which the fingertip TCP is prohibited from passing, are calculated by the following Expression 10 and Expression 11:

$$^{TOTE}T_{KeepoutItem,i} = \begin{bmatrix} ^{TOTE}R_{Keepout,i} & ^{TOTE}x_{Keepout,i} - \\ & (\Delta x_{Item+} + \Delta x_{Item-})/2 \\ & ^{TOTE}y_{Keepout,i} - \\ & (\Delta y_{Item+} + \Delta y_{Item-})/2 \\ & ^{TOTE}z_{Keepout,i} + \\ & ^{TOTE}SZ_{Item} \\ 0 & 1 \end{bmatrix} \quad \text{(Expression 10)}$$

$$^{TOTE}S_{KeepoutItem,i} = \begin{bmatrix} ^{TOTE}sx_{Keepout,i} + (\Delta x_{Item+} - \Delta x_{Item-}) \\ ^{TOTE}sy_{Keepout,i} + (\Delta y_{Item+} - \Delta y_{Item-}) \\ ^{TOTE}sz_{Keepout,i} \end{bmatrix} \quad \text{(Expression 11)}$$

where $^{TOTE}T_{Keepout,i}$ represents the position and pose of the second region 100 calculated by Expression 6 to Expression 9 (i=1, . . . , n: n is the number of the objects OBJs and $^{TOTE}S_{Keepout,i}$ represents the size thereof. The displacement amounts of the side surface of the object OBJ from the fingertip TCP $\Delta x_{Item-}$ and $\Delta x_{Item+}$ in the X-direction and $\Delta y_{Item-}$ and $\Delta y_{Item+}$ in the Y-direction are calculated by the following Expression 12:

$$\Delta x_{Item+} = {}^{TOTE}x_{Item} + {}^{TOTE}sx_{Item} - {}^{TOTE}x_{RP} \quad \text{(Expression 12)}$$
$$\Delta x_{Item-} = {}^{TOTE}x_{Item} - {}^{TOTE}sx_{Item} - {}^{TOTE}x_{RP}$$
$$\Delta y_{Item+} = {}^{TOTE}y_{Item} + {}^{TOTE}sy_{Item} - {}^{TOTE}y_{RP}$$
$$\Delta y_{Item-} = {}^{TOTE}y_{Item} - {}^{TOTE}sy_{Item} - {}^{TOTE}y_{RP}$$

where $^{TOTE}T_{RP}$ represents the position and pose of the fingertip TCP when placed, $^{TOTE}T_{Item}$ represents the position and pose of the object OBJs, and $^{TOTE}S_{Item}$ represents the size of the object OBJs.

Subsequently, the second region 100 is calculated, considering the position and the size of the hand 22 grasping the object OBJ.

Figure 20:
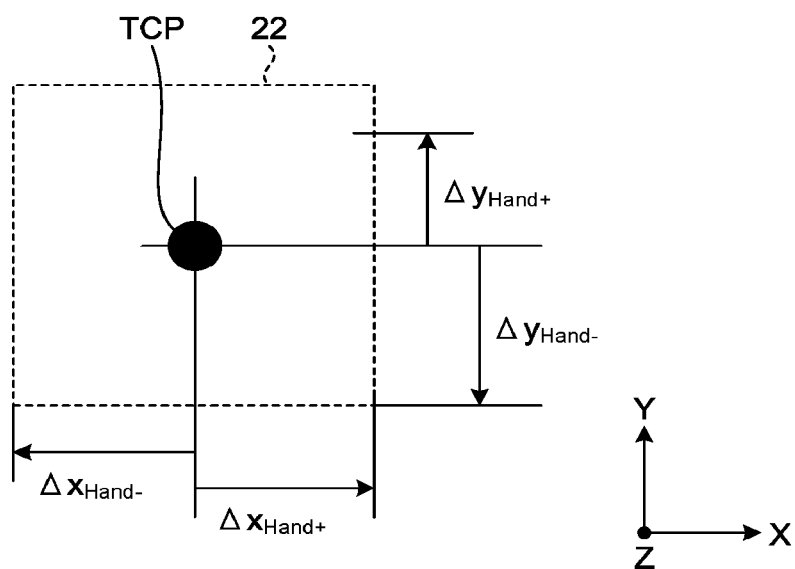
FIG. 20 is an exemplary and schematic top view for explaining an assumed value of the hand in setting the second region, considering the size of the hand in the object handling device of the embodiment.
Figure 21:
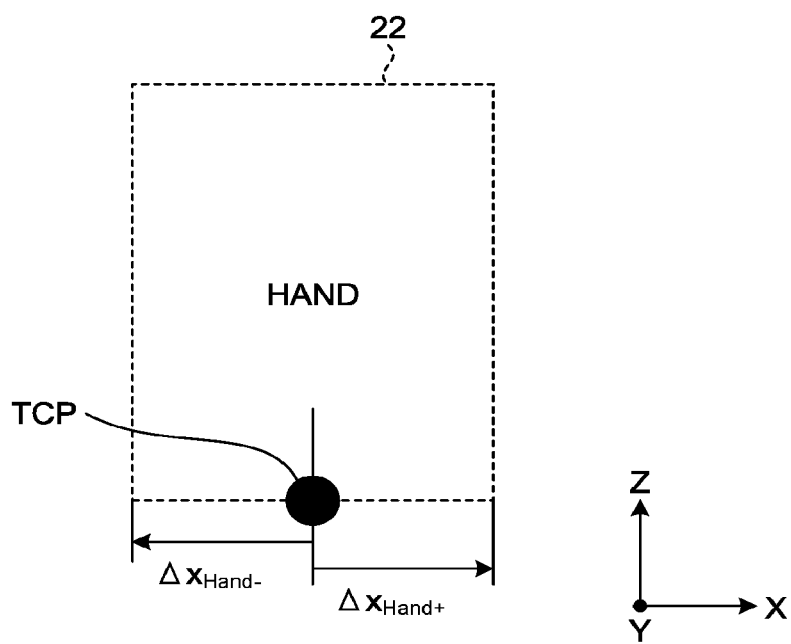
FIG. 21 is an exemplary and schematic side view for explaining an assumed value of the hand in setting the second region, considering the size of the hand in the object handling device of the embodiment.

First, as illustrated in FIG. 20 and FIG. 21, X- and directional distances from the fingertip TCP to end faces of the hand 22 are defined to be $\Delta x_{hand-}$, $\Delta x_{hand+}$, $\Delta y_{hand-}$, and $\Delta y_{hand+}$.

Figure 22:
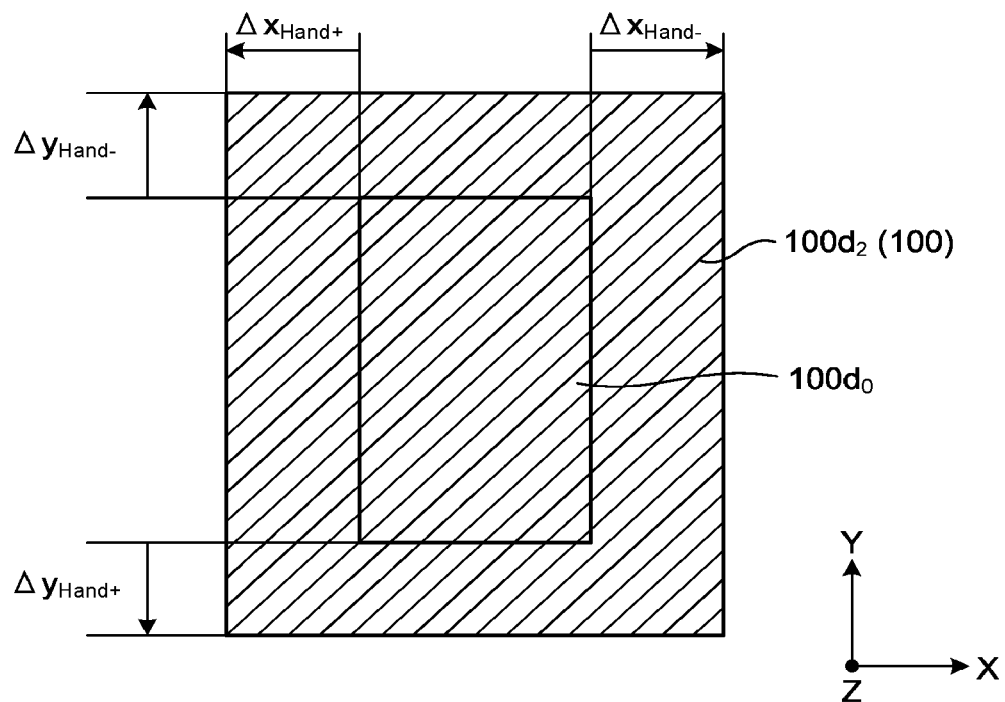
FIG. 22 is an exemplary and schematic top view for setting the second region, considering the size of the hand in the object handling device of the embodiment.
Figure 23:
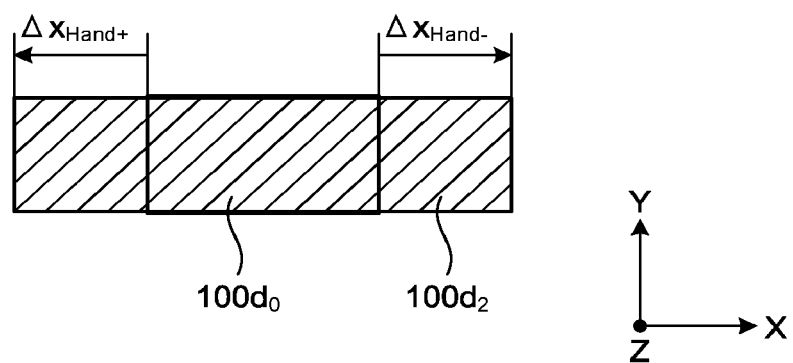
FIG. 23 is an exemplary and schematic side view for setting the second region, considering the size of the hand in the object handling device of the embodiment.

As with vertical interference of the object OBJ, vertical interference of the bottom surface of the hand 22 matters. Regarding horizontal interference, when the bottom surface of the hand 22 interferes with no obstacle, the side surface thereof can be regarded as interfering with no obstacle. That is, the second region 100 can be set, considering the position and the size of the bottom of the hand 22 alone. Thus, in the case of setting the second region 100 considering the position and the size of the hand 22, the second region 100 (second region $100d_2$) can be calculated in the X and Y directions by widening the second region $100d_0$, reflecting the position and the size of the object OBJ, by margins $\Delta x_{hand-}$ and $\Delta x_{hand+}$ in the X-direction and $\Delta y_{hand-}$ and $\Delta y_{hand+}$ in the Y-direction, as illustrated in FIG. 22 and FIG. 23.

In this case, the position and pose $^{TOTE}T_{KeepoutHand,i}$ and the size $^{TOTE}S_{KeepoutHand,i}$ of the second region 100, set considering the hand 22, through which the fingertip TCP is prohibited from passing, are calculated by the following Expression 13 and Expression 14.

$$^{TOTE}T_{KeepoutHand,i} = \begin{bmatrix} & ^{TOTE}x_{Keepout,i} + \\ & (\Delta x_{Hand+} + \Delta x_{Hand-})/2 \\ ^{TOTE}R_{Keepout,i} & ^{TOTE}y_{Keepout,i} + \\ & (\Delta y_{Hand+} + \Delta y_{Hand-})/2 \\ & ^{TOTE}z_{Keepout,i} \\ 0 & 1 \end{bmatrix}$$ (Expression 13)

$$^{TOTE}S_{KeepoutHand,i} = \begin{bmatrix} ^{TOTE}sx_{Keepout,i} + (\Delta x_{Hand+} - \Delta x_{Hand-}) \\ ^{TOTE}sy_{Keepout,i} + (\Delta y_{Hand+} - \Delta y_{Hand-}) \\ ^{TOTE}sz_{Keepout,i} \end{bmatrix}$$ (Expression 14)

where $^{TOTE}T_{Keepout,i}$ represents the position and pose of the second region 100 through which the fingertip TCP is prohibited from passing, set by Expression 6 to Expression 9 (i=1, . . . , n: n is the number of the objects OBJs), and $^{TOTE}S_{Keepout,i}$ represents the size thereof.

Positions of side surfaces of a circumscribing rectangular parallelepiped of the hand 22 from the fingertip TCP are represented by $\Delta x_{Hand-}$ and $\Delta x_{Hand+}$ in the X-direction and $\Delta y_{Hand-}$ and $\Delta y_{Hand+}$ in the Y-direction and calculated by the following Expression 15:

$$\Delta x_{Hand+} = {}^{TOTE}x_{Hand} + {}^{TOTE}sx_{Hand} - {}^{TOTE}x_{RP}$$ (Expression 15)
$$\Delta x_{Hand-} = {}^{TOTE}x_{Hand} - {}^{TOTE}sx_{Hand} - {}^{TOTE}x_{RP}$$
$$\Delta y_{Hand+} = {}^{TOTE}y_{Hand} + {}^{TOTE}sy_{Hand} - {}^{TOTE}y_{RP}$$
$$\Delta y_{Hand-} = {}^{TOTE}y_{Hand} + {}^{TOTE}sy_{Hand} - {}^{TOTE}y_{RP}$$

where the circumscribing rectangular parallelepiped is perpendicular to and parallel with the coordinate system of the container 14b being a moving destination, $^{TOTE}T_{RP}$ represents the position and pose of the fingertip TCP at the placement position, $^{TOTE}T_{Hand}$ represents the position and pose of the circumscribing rectangular parallelepiped of the hand 22, and $^{TOTE}S_{Hand}$ represents the size thereof.

The second region 100 (second region 100$d_1$) reflecting the object OBJ grasped by the hand 22 and the second region 100 (second region 100$d_2$) reflecting the hand 22 can be combined together to set or calculate a definitive second region 100.

The following describes setting the second control region 102b of the third region 102. As described above, due to the second region 100 above and adjacent to the first control region 102a, the object OBJ and the hand 22 do not approach the first control region 102a of the third region 102 from the vertical direction or above but approach there from the horizontal direction or laterally. In the second control region 102b of the third region 102, if the object OBJ or the hand 22 interferes or contacts with the obstacle, the object OBJ and the hand 22 can be prevented from being damaged under the repulsive control of the force control. In the repulsive control, force acting on the object OBJ and the hand 22 is accurately controlled and the measured value of the force sensor 31 is fed back thereto not to apply abrupt external force, thereby causing the object OBJ and the hand 22 to approach the obstacle at a lower speed.

Meanwhile, the pressing control of the force control in the first control region 102a includes first pressing control and second pressing control. The first pressing control is to be performed to the wall 14W or the side surface of the previously set object OBJs while the object OBJ is moving. The second pressing control is to be performed to the object OBJ for placement at the moving destination RP. The first pressing control enables the object OBJ to pass in the first control region 102a by setting the margin of the first control region 102a to substantially zero in generating the moving route in a small space as described above. Thus, in the first pressing control, the object OBJ is pressed against the surface of the wall 14W in a substantially orthogonal direction, for example, by pressing force of a given threshold or less at a moving speed of a given threshold below, which are defined as a first pressing condition. The pressing force of the given threshold or less and the moving speed of the given threshold or less can be predetermined through testing in accordance with a type, a shape, material, or resistance of the object OBJ.

The second pressing control is to cause the hand 22 to slowly approach the first control region 102a from obliquely upward to set the object OBJ at the moving destination RP by setting the margin of the first control region 102a to substantially zero as described above. Thus, in the second pressing control, the object OBJ is pressed against the side surface of the object OBJs or the surface of the wall 14W, for example, at a moving speed of a given threshold or less at a given approach angle which are defined as a second pressing condition. The given approach angle and the moving speed of the given threshold can be predetermined through testing in accordance with a type, a shape, material, or resistance of the object OBJ.

As described above, the second control region 102b is set laterally adjacent to the first control region 102a opposite to the obstacle. The second control region 102b is part of the third region 102 in which the force control is performed, and the repulsive control of the force control is performed the second control region 102b. In the second control region 102b, the object OBJ and the hand 22 are allowed to move under the repulsive control even after interference with the obstacle is detected. In the second control region 102b, the behavior of at least the hand 22 may be limited, to prepare for the pressing control in the first control region 102a. In this case, the behavioral limitation to the hand 22 refers to, for example, limiting the moving speed to the one lower (for example, ½ or ⅓) than that in the first region 104.

In the repulsive control of the force control, the hand 22 grasping the object OBJ moves while the measured value of the force sensor 31 is fed back to the object OBJ and the hand 22. Under the repulsive control, the hand 22 is controlled to approach the wall 14W or the side surface of the object OBJs at the moving speed of the given threshold or less and move apart from the contact surface before substantial reaction force occurs, that is, upon detecting contact. For example, along a calculated moving route not interfering with the obstacle, the hand 22 may come into contact with the wall 14W or the side surface of the object OBJs due to measurement error of the sensor 30. In such a case, the measurement error can be eliminated by the repulsive control, makes it possible to avoid the hand 22 or the object OBJ from being damaged due to a collision with the wall 14W or the side surface of the object OBJs.

Figure 24:
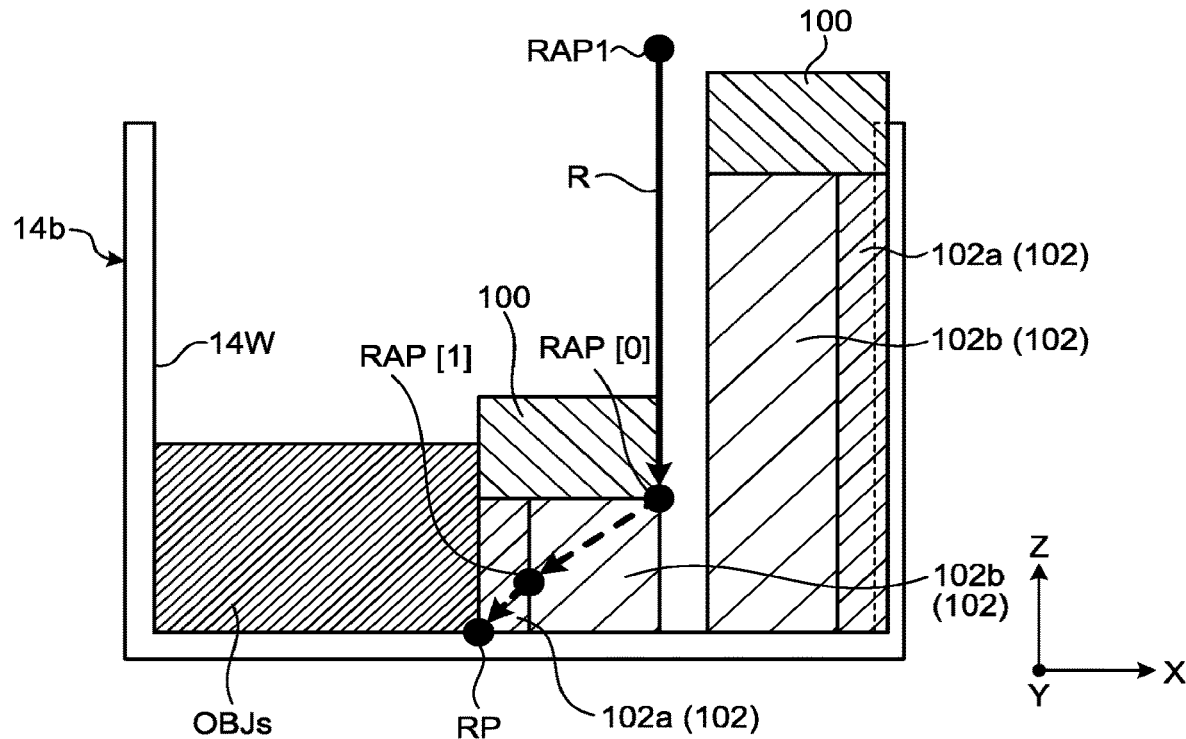
FIG. 24 is an exemplary and schematic explanatory diagram of the set regions and a moving route in the object handling device of the embodiment.
Figure 25:
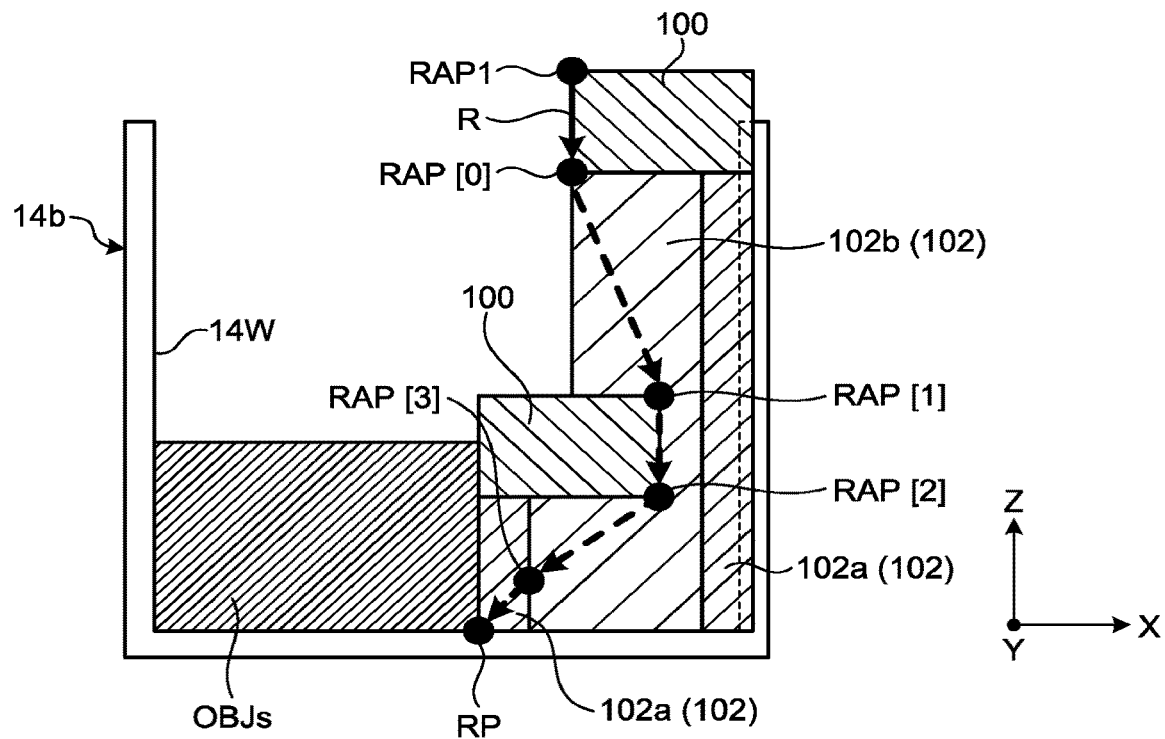
FIG. 25 is another exemplary and schematic explanatory diagram of the set regions and a moving route in the object handling device of the embodiment.

With reference to FIG. 24 and FIG. 25, the following describes an example of setting the second region 100, the second control region 102b of the third region 102, and the first region 104, and setting the moving route R of the hand 22 (or fingertip TCP) with respect to the container 14b being the moving destination RP.

In FIG. 24 the second region 100 and the first control region 102a of the third region 102 are set in the container 14b in which the object OBJs has been placed, and the second control region 102b is set below the second region 100 and laterally adjacent to the first control region 102a opposite to the obstacle, as illustrated with reference to FIG. 12 to FIG. 23. The region other than the second region 100 and the third region 102 including the first control region 102a and the second control region 102b is set to the first region 104 in which the hand 22 grasping the object OBJ is not restricted from moving but movable at a relatively high speed.

In the example of FIG. 24, the first region 104 lies between the second region 100 with respect to the object OBJs and the second region 100 with respect to the wall 14W of the container 14b, and the hand 22 grasping the object OBJ is movable relatively freely therein. In FIG. 24, the hand (fingertip TCP) moves vertically downward at a high speed in the first region 104 from via points RAP[1] to RAP[0], and the fingertip TCP enters the second control region 102b of the third region 102. In the second control region 102b, the hand 22 grasping the object OBJ is moved at the moving speed of the given threshold by the repulsive control while the measured value of the force sensor 31 is fed back. Under the repulsive control, for example, the hand 22 is controlled to approach the wall 14W or the side surface of the object OBJ and detect contact before substantial reaction force occurs, to move the object OBJ apart from the contact surface. The hand 22 may be moved to RAP[1] at a lower speed than in the first region 104 for the purpose of preparation for smooth switching to the pressing control in the second control region 102b without delay, for smoothly moving toward the moving destination RP in the first control region 102a adjacent to the side surface of the object OBJs. In the first control region 102a between RAP[1] and the moving destination RP, the hand 22 is moved under the second pressing control, satisfying the second pressing condition. In this way, the object handling system 1 or object handling device can decide the moving route R, the moving speed, and other moving property with reference to the first region 104, the second region 100, and the third region 102 including the first control region 102a and the second control region 102b, thereby rapidly and accurately moving or placing the object OBJ to or at the moving destination RP without inflicting damage.

FIG. 25 illustrates an example that the second region 100 with respect to the object OBJs is close to the first control region 102a with respect to the wall 14W of the container 14b with no first region 104 set therebetween. In FIG. 25, the hand 22 or fingertip TCP moves vertically downward at a high speed from RAP[1] to RAP[0] in the first region 104. The fingertip TCP then enters the second control region 102b, and moves through RAP[1], RAP[2], and RAP[3] at a preparation speed lower than in the first region 104. The hand 22 is moved between RAP[3] and the moving destination RP under the second pressing control, satisfying the second pressing condition. Also in this case, the object handling system 1 or object handling device can decide the moving route R, the moving speed, and other moving property with reference to the first region 104, the second region 100, and the second control region 102b. As a result, although it takes a longer time due to passing through the second control region 102b than in FIG. 24, the object handling system 1 or object handling device can move or place the object OBJ to or at the moving destination RP as rapid and accurate as possible without inflicting damage.

Figure 26:
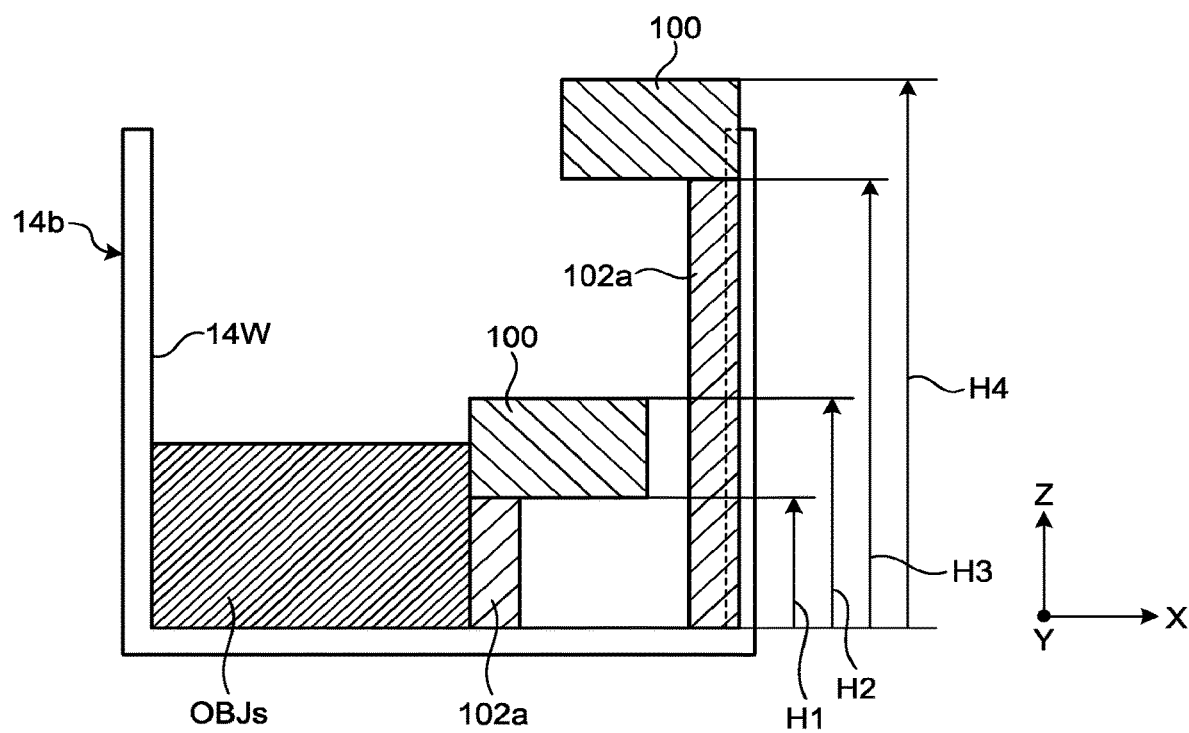
FIG. 26 is an exemplary and schematic explanatory diagram illustrating an interference check height in the second region in the object handling device of the embodiment.

To set the moving route R as illustrated in FIG. 24 and FIG. 25 described above, it is preferable to accurately know locations where the moving route interferes or contacts with the second region 100. Thus, with the second region 100 set in the container 14b, the route calculator 56 generates a height (Z-direction) list for interference check. The height at which interference is checked can be defined to be heights of the top and bottom of the second region 100 as illustrated in FIG. 26. FIG. 26 illustrates exemplary heights for interference check when the container 14b contains the previously set object OBJs, and the second region 100 and the first control region 102a of the third region 102 are set with reference to FIG. 12 to FIG. 23.

Specifically, the height list for interference check $^{TOTE}Z_{Check,j}$ (j=1 ..., 2n) can be calculated by the following Expression 16:

$$^{TOTE}z_{Check,2i-1} = {}^{TOTE}z_{Keepout,i} - {}^{TOTE}sz_{Keepout,i}/2 \quad \text{(Expression 16)}$$
$$^{TOTE}z_{Check,2i} = {}^{TOTE}z_{Keepout,i} + {}^{TOTE}sz_{Keepout,i}/2$$

where $^{TOTE}T_{Keepout,i}$ represents the position and pose of the second region 100 through which the fingertip TCP is prohibited from passing (i=1 ..., n), and $^{TOTE}S_{Keepout,i}$ represents the size thereof.

The height list for interference check $^{TOTE}Z_{check,j}$ contains the heights in ascending order from a lowest height, such as H1 to H4.

Figure 27:
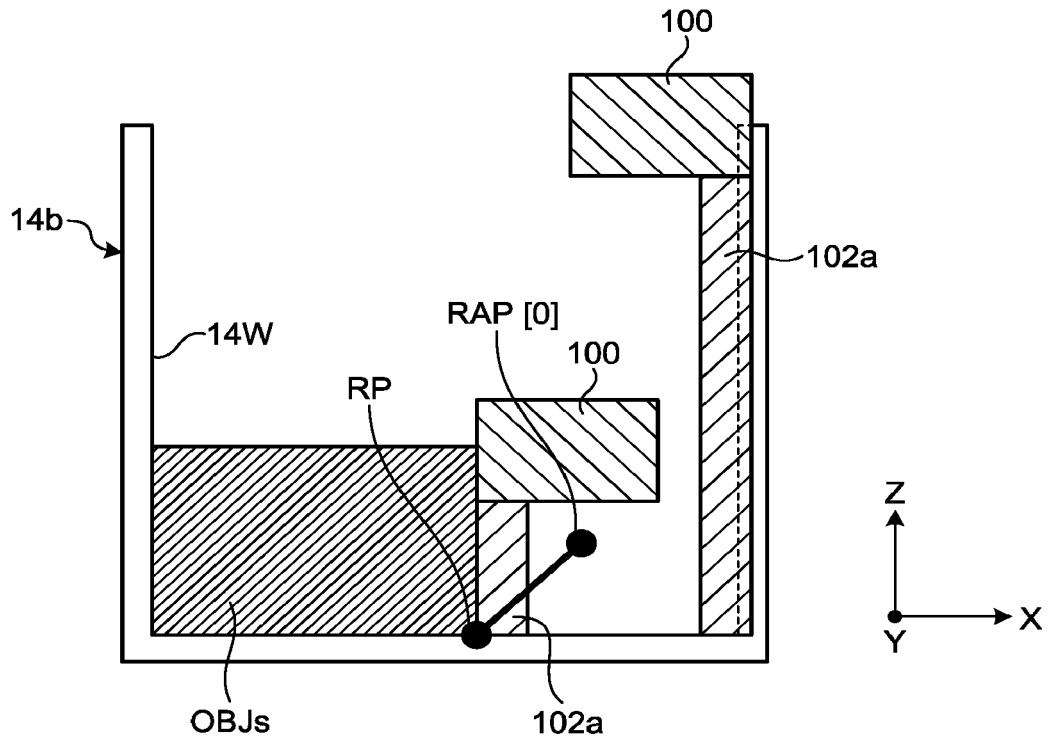
FIG. 27 is a schematic explanatory diagram illustrating an example of generating an initial via point of a moving route in the object handling device of the embodiment.

Next, the following describes calculation of the fingertip position TCP for avoiding the second region 100 in which the hand 22 is restricted from passing. The hand 22 grasping the object OBJ follows the moving route R to enter the container 14b from upward, for example, however, at the time of planning the moving route R, the via points on the moving route R are set by back calculation from the moving destination RP to an entry position. FIG. 27 illustrates an example of placing the object OBJ grasped by the hand 22 in tight contact with the right-side surface of the previously set object OBJs in tight contact with the wall 14W of the container 14b. According to the present embodiment, in the initial via-point calculation routine, the obliquely upwardly offset position from the moving destination RP is set to RAP[0]. To place the object OBJ in tight contact with the previously set object OBJs or the wall 14W, the second pressing control is performed. In this case, for example, the object OBJ approaches there from obliquely upward to be able to smoothly come into tight contact therewith. In view of this, the offset amount is preset through testing. For example, the offset amount, that is, RAP[0] can be set to allow the object OBJ to approach from the height of 20 mm at 45 degrees.

Figure 28:
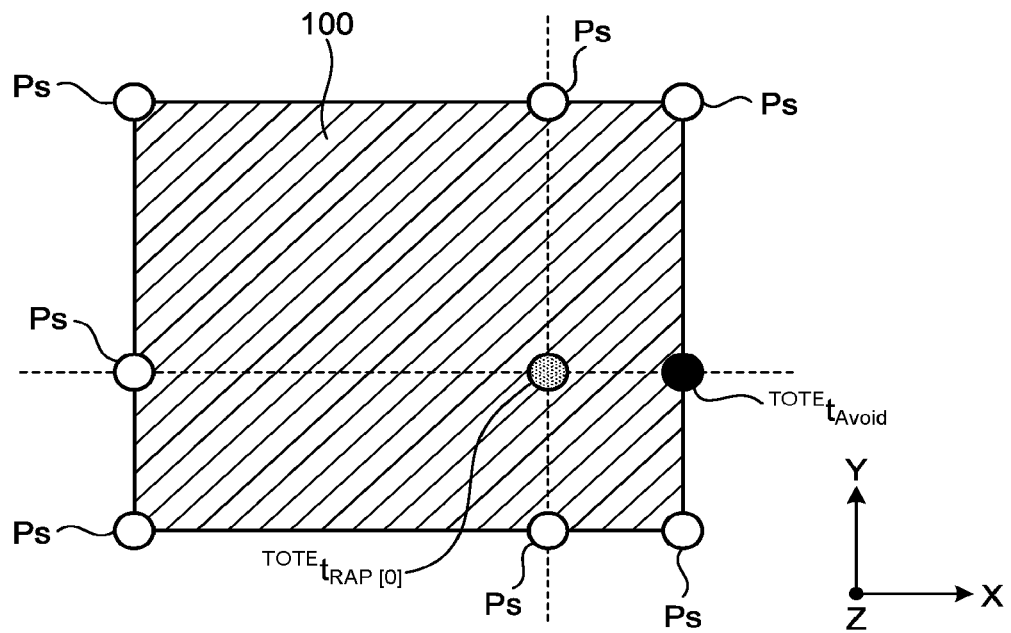
FIG. 28 is an exemplary and schematic explanatory diagram for calculating a position of the hand not to pass through the second region in the object handling device of the embodiment.

Next, a next via point is set from RAP[0] as the initial via position or pose. In this case, the route calculator 56 extracts the second region 100 at each of heights for interference check, described with reference to FIG. 26. After finding that the second region 100 includes part of the route from RAP[0] toward directly above, the route calculator 56 calculates via points to avoid the second region 100, which will be referred to as avoidance via points. An avoidance via point is set to a point closest to RAP[0] in a region not included in the second region 100. FIG. 28 illustrates an example of calculating the avoidance via point.

First, among the apexes of the second region 100, apexes not included in another second region 100 are defined to be candidates for avoidance position Ps (in FIG. 28, four corner points of the second region 100). Herein, apexes $^{TOTE}t_{AvoidCorner,i,j}$ (j=1, 2, 3, 4) of the second region 100 to be added to the candidates for avoidance positions can be calculated by the following Expression 17:

$$^{TOTE}t_{AvoidCorner,i,1} = \begin{bmatrix} ^{TOTE}x_{Keepout,1} - {}^{TOTE}sx_{Keepout,i}/2 \\ ^{TOTE}y_{Keepout,1} - {}^{TOTE}sy_{Keepout,i}/2 \\ ^{TOTE}z_{Keepout,i} \end{bmatrix}$$ (Expression 17)

$$^{TOTE}t_{AvoidCorner,i,2} = \begin{bmatrix} ^{TOTE}x_{Keepout,1} + {}^{TOTE}sx_{Keepout,i}/2 \\ ^{TOTE}y_{Keepout,1} - {}^{TOTE}sy_{Keepout,i}/2 \\ ^{TOTE}z_{Keepout,i} \end{bmatrix}$$

$$^{TOTE}t_{AvoidCorner,i,3} = \begin{bmatrix} ^{TOTE}x_{Keepout,1} + {}^{TOTE}sx_{Keepout,i}/2 \\ ^{TOTE}y_{Keepout,1} - {}^{TOTE}sy_{Keepout,i}/2 \\ ^{TOTE}z_{Keepout,i} \end{bmatrix}$$

$$^{TOTE}t_{AvoidCorner,i,4} = \begin{bmatrix} ^{TOTE}x_{Keepout,1} + {}^{TOTE}sx_{Keepout,i}/2 \\ ^{TOTE}y_{Keepout,1} + {}^{TOTE}sy_{Keepout,i}/2 \\ ^{TOTE}z_{Keepout,i} \end{bmatrix}$$

where $^{TOTE}T_{Keepout,i}$ represents the position and pose of the second region 100 through which the fingertip TCP is prohibited from passing (i=1 . . . , n), and $^{TOTE}S_{Keepout,i}$ represents the size thereof Subsequently, among intersections between the respective sides of the second region 100 and straight lines extending in the X-direction and the Y-direction from a pre-avoidance position, i.e., $^{TOTE}t_{RAP[0]}$ in FIG. 28, intersections not included in another second region 100 are additionally set as candidates for avoidance position Ps. The candidates for avoidance position $^{TOTE}t_{AvoidParallel,i,j}$ (j=1, 2, 3, 4) to be added can be calculated by the following Expression 18:

$$^{TOTE}t_{AvoidParallel,i,1} = \begin{bmatrix} ^{TOTE}x_{Keepout,1} - {}^{TOTE}sx_{Keepout,i}/2 \\ ^{TOTE}y_{RAP[0]} \\ ^{TOTE}z_{Keepout,i} \end{bmatrix}$$ (Expression 18)

$$^{TOTE}t_{AvoidParallel,i,2} = \begin{bmatrix} ^{TOTE}x_{Keepout,1} + {}^{TOTE}sx_{Keepout,i}/2 \\ ^{TOTE}y_{RAP[0]} \\ ^{TOTE}z_{Keepout,i} \end{bmatrix}$$

$$^{TOTE}t_{AvoidParallel,i,3} = \begin{bmatrix} ^{TOTE}x_{RAP[0]} \\ ^{TOTE}y_{Keepout,1} - {}^{TOTE}sy_{Keepout,i}/2 \\ ^{TOTE}z_{Keepout,i} \end{bmatrix}$$

$$^{TOTE}t_{AvoidParallel,i,4} = \begin{bmatrix} ^{TOTE}x_{RAP[0]} \\ ^{TOTE}y_{Keepout,1} + {}^{TOTE}sy_{Keepout,i}/2 \\ ^{TOTE}z_{Keepout,i} \end{bmatrix}.$$

$^{TOTE}t_{AvoidCorner,i,j}$ calculated by Expression 17 and $^{TOTE}t_{AvoidParallel,i,j}$ calculated by Expression 18 are combined to set an avoidance-position candidate list $^{TOTE}t_{AvoidAll,i}$. In this candidate list, the point closest to the position $^{TOTE}t_{RAP[0]}$ (pre-avoidance position) of RAP[0] is defined to be an avoidance position $^{TOTE}t_{Avoid}$. The avoidance position $^{TOTE}t_{Avoid}$ can be calculated by the following Expression 19:

$$^{TOTE}t_{Avoid} = {}^{TOTE}t_{AvoidAll,j}$$ (Expression 19)

$$j = \arg\min_i \| {}^{TOTE}t_{AvoidAll,i} - {}^{TOTE}t_{RAP[0]} \|.$$

Figure 29:
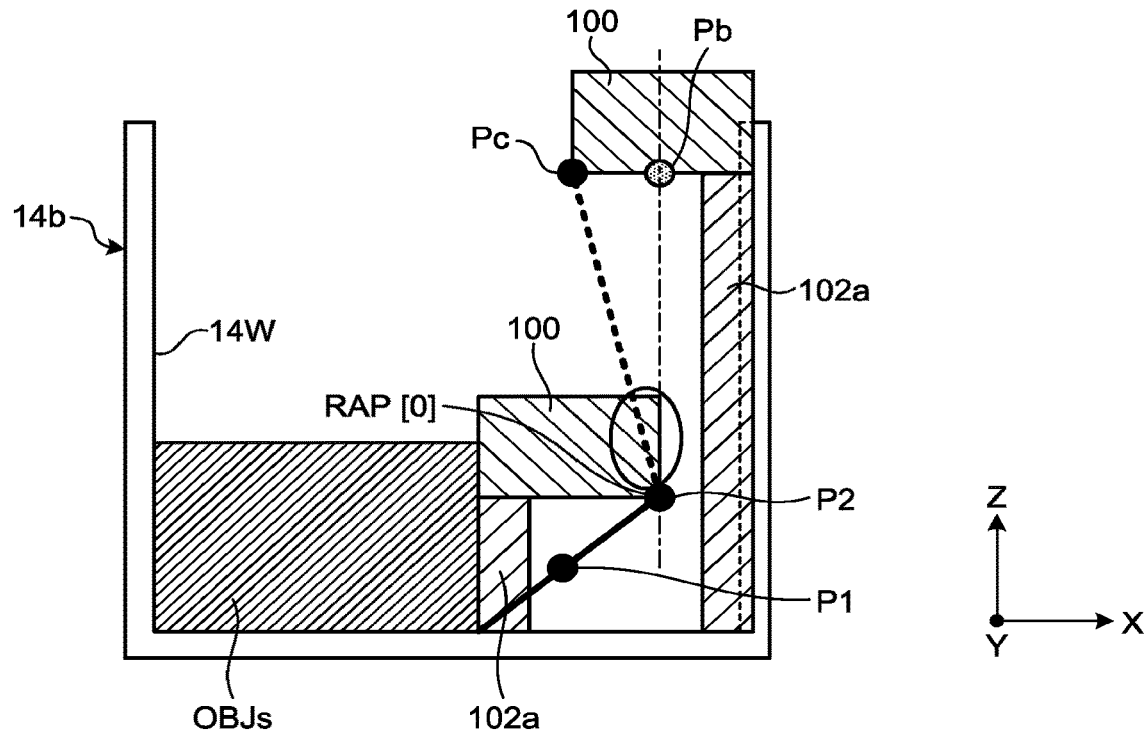
FIG. 29 is an exemplary and schematic explanatory diagram for generating via points not to pass through the second region in the object handling device of the embodiment.
Figure 30:
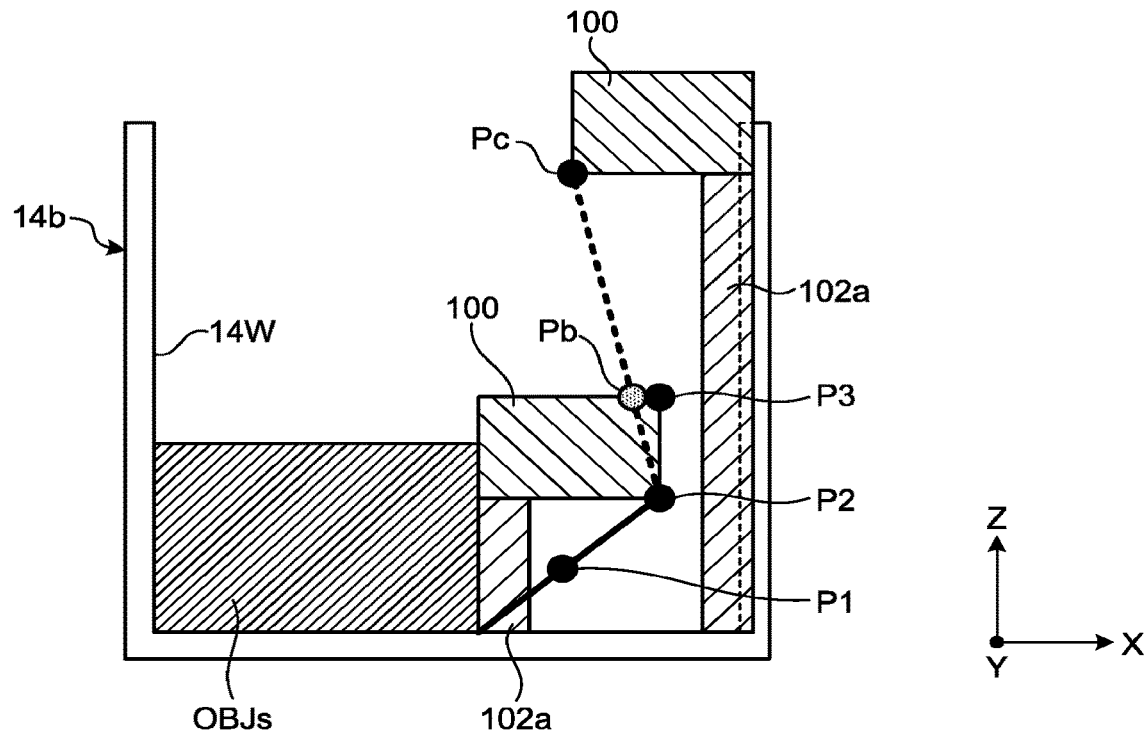
FIG. 30 is an exemplary and schematic explanatory diagram for generating a next via point following the via points in FIG. 29 not to pass through the second region.
Figure 31:
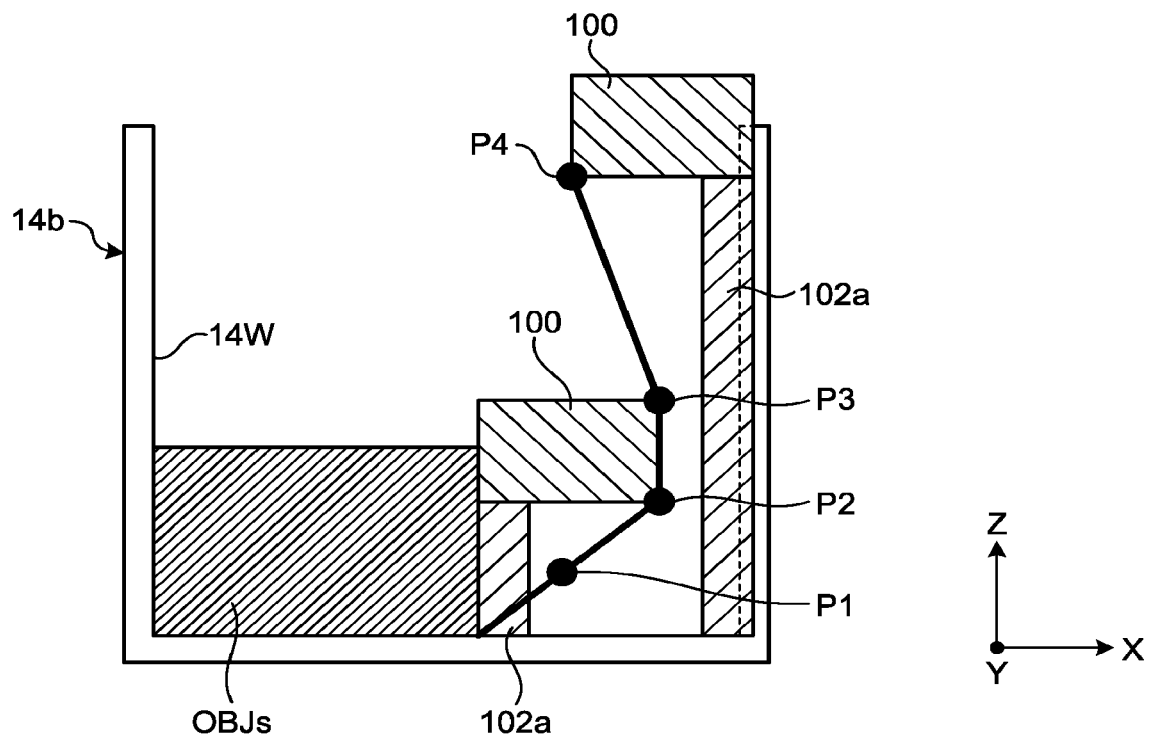
FIG. 31 is an exemplary and schematic explanatory diagram for generating a next via point following the via points in FIG. 30 not to pass through the second region following the via points in FIG. 30.

Subsequently, the route calculator 56 checks whether the linear moving route connecting $^{TOTE}t_{Avoid}$ calculated in FIG. 28 and RAP[0] set in FIG. 27 passes the second region 100. After determining that the moving route passes the second region 100, the route calculator 56 calculates the avoidance position again for the second region 100 through the procedure described with reference to FIG. 28. FIG. 29 to FIG. 31 illustrate examples of specific processing.

In FIG. 29, for example, a straight line is extended from a previous RAP[0] being point P1, and an intersection between the straight line and the second region 100 is defined to be a new RAP[0] being point P2. The straight line extending upward from the point P2 to avoid the second region 100 intersects with the second region 100 at a point Pb on the bottom of the upper second region 100. In the pre-avoidance position being the point Pb, an end point Pc of the second region 100 can be the avoidance position for avoiding intersection with the second region 100. However, in this case, the straight line connecting the point P2 and the point Pc passes the lower second region 100. Thus, as illustrated in FIG. 30, the point Pb at which the straight line connecting the point P2 and the point Pc intersects with the top of the lower second region 100 is set to a new pre-avoidance position. In this case, an end point P3 of the second region 100 can be the avoidance position for avoiding intersection with the second region 100. That is, an avoidance route is from the point P2 to the point P3. As illustrated in FIG. 31, the previous avoidance position, i.e., the point Pc on the bottom of the upper second region 100 is corrected to a point P4, and the point P3 is connected to the point P4. In FIG. 31, the straight line extending upward from the point P4 does not intersect with the second region 100. This completes the avoidance route. In other words, the moving route connecting the points P1, P2, P3, and P4 is completed.

The following describes the above processing in more detail. A determination may be made on whether there is any intersection between a line segment $L_{RAP[0],Avoid}$ connecting the position $^{TOTE}t_{RAP[0]}$ of RAP[0] and the avoidance position $^{TOTE}t_{Avoid}$ and the top and bottom of each second region 100. Z-coordinates $^{TOTE}z_{KeepoutTop,i}$ and $^{TOTE}z_{KeepoutBottom,i}$ of the top and bottom of each second region 100 can be calculated by Expression 20:

$$^{TOTE}z_{KeepoutTop,i} = {}^{TOTE}z_{Keepout,i} + {}^{TOTE}sz_{Keepout,i}/2$$ (Expression 20)

$$^{TOTE}z_{KeepoutBottom,i} = {}^{TOTE}z_{Keepout,i} - {}^{TOTE}sz_{Keepout,i}/2$$

where $^{TOTE}T_{Keepout,i}$ represents the position and pose of the second region 100 through which the fingertip TCP is prohibited from passing (i=1 . . . , n), and $^{TOTE}S_{Keepout,i}$ represents the size thereof.

To cause the line segment $L_{RAP[0],Avoid}$ to intersect with $^{TOTE}z_{KeepoutTop,i}$ and $^{TOTE}z_{KeepoutBottom,i}$, at least the following Expression 21 is to be satisfied:

$$^{TOTE}z_{RAP[0]} < {}^{TOTE}z_{KeepoutTop,i} \quad \text{(Expression 21)}$$

$$^{TOTE}z_{zKeepoutBottom,i} < {}^{TOTE}z_{Avoid}.$$

The coordinates $^{TOTE}t_{CrossTop,i}$ and $^{TOTE}t_{CrossBottom,i}$ of the line segment $L_{RAP[0],Avoid}$ at $^{TOTE}z_{KeepoutTop,i}$ and $^{TOTE}z_{KeepoutBottom,i}$ can be calculated by the following Expression 22:

$$^{TOTE}t_{CrossTop,i} = \begin{bmatrix} ^{TOTE}x_{RAP[0]} + \frac{^{TOTE}x_{Avoid} - {}^{TOTE}x_{RAP[0]}}{^{TOTE}z_{Avoid} - {}^{TOTE}z_{RAP[0]}} \\ (^{TOTE}z_{keepoutTop,i} - {}^{TOTE}z_{RAP[0]}) \\ ^{TOTE}y_{RAP[0]} + \frac{^{TOTE}y_{Avoid} - {}^{TOTE}y_{RAP[0]}}{^{TOTE}z_{Avoid} - {}^{TOTE}z_{RAP[0]}} \\ (^{TOTE}z_{keepoutTop,i} - {}^{TOTE}z_{RAP[0]}) \\ ^{TOTE}z_{keepoutTop,i} \end{bmatrix} \quad \text{(Expression 22)}$$

$$^{TOTE}t_{CrossBottm,i} = \begin{bmatrix} ^{TOTE}x_{RAP[0]} + \frac{^{TOTE}x_{Avoid} - {}^{TOTE}x_{RAP[0]}}{^{TOTE}z_{Avoid} - {}^{TOTE}z_{RAP[0]}} \\ (^{TOTE}z_{keepoutBottm,i} - {}^{TOTE}z_{RAP[0]}) \\ ^{TOTE}y_{RAP[0]} + \frac{^{TOTE}y_{Avoid} - {}^{TOTE}y_{RAP[0]}}{^{TOTE}z_{Avoid} - {}^{TOTE}z_{RAP[0]}} \\ (^{TOTE}z_{keepoutBottm,i} - {}^{TOTE}z_{RAP[0]}) \\ ^{TOTE}z_{keepoutBottm,i} \end{bmatrix}$$

These intersections $^{TOTE}t_{CrossTop,i}$ and $^{TOTE}z_{CrossBottom,i}$ satisfying the condition represented by the following Expression 23 are included in the second region 100:

$$^{TOTE}x_{Keepout,i} - {}^{TOTE}sx_{Keepout,i}/2 < \quad \text{(Expression 23)}$$
$$^{TOTE}x_{CrossTop,i} < {}^{TOTE}x_{Keepout,i} + {}^{TOTE}sx_{Keepout,i}/2$$
$$^{TOTE}y_{Keepout,i} - {}^{TOTE}sy_{Keepout,i}/2 <$$
$$^{TOTE}y_{CrossTop,i} < {}^{TOTE}y_{Keepout,i} + {}^{TOTE}sy_{Keepout,i}/2$$

or $$^{TOTE}x_{Keepout,i} - {}^{TOTE}sx_{Keepout,i}/2 <$$
$$^{TOTE}x_{CrossBottm,i} < {}^{TOTE}x_{Keepout,i} + {}^{TOTE}sx_{Keepout,i}/2$$
$$^{TOTE}y_{Keepout,i} - {}^{TOTE}sy_{Keepout,i}/2 <$$
$$^{TOTE}y_{CrossBottm,i} < {}^{TOTE}y_{Keepout,i} + {}^{TOTE}sy_{Keepout,i}/2.$$

If the line segment $L_{RAP[0],Avoid}$ is found to intersect with the second region 100, the coordinates of the line segment $L_{RAP[0],Avoid}$ at a minimum height of the heights $^{TOTE}z_{KeepoutTop,i}$ and $^{TOTE}z_{KeepoutBottom,i}$ of the top or the bottom of the intersecting second region 100 is set to a new pre-avoidance position. The avoidance position is calculated through the procedure described with reference to FIG. 28.

Figure 32:
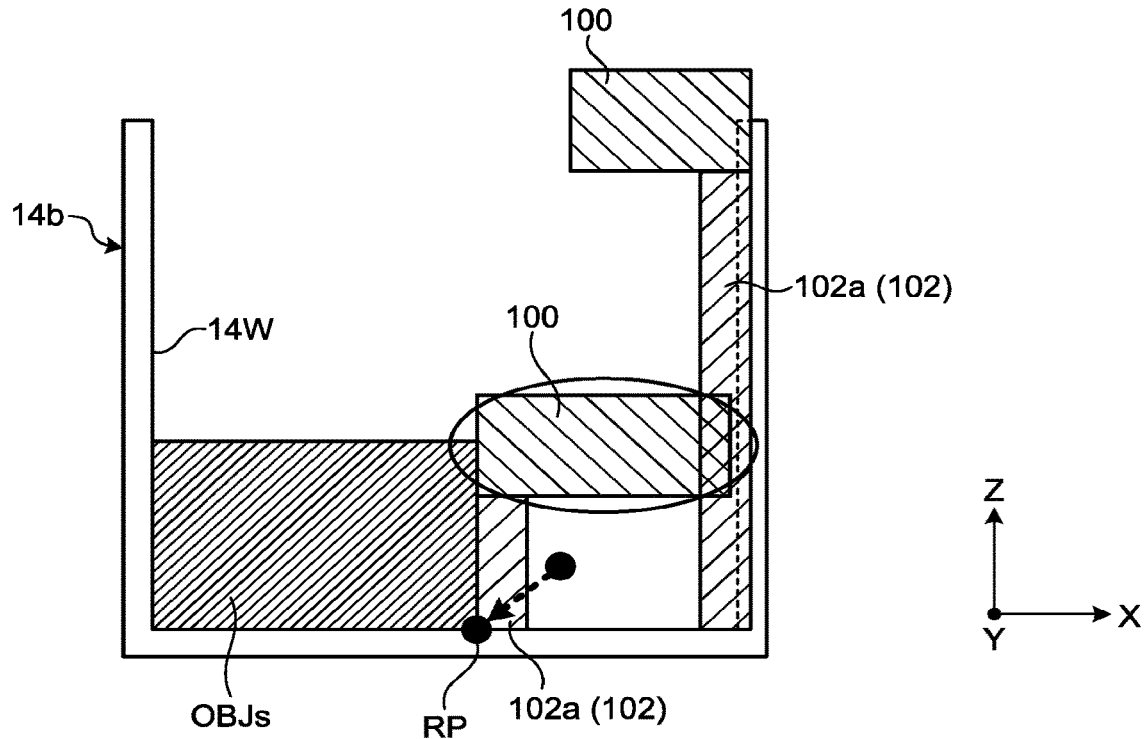
FIG. 32 is an exemplary and schematic explanatory diagram of an example that passing through the second region is unavoidable in the object handling device of the embodiment.
Figure 33:
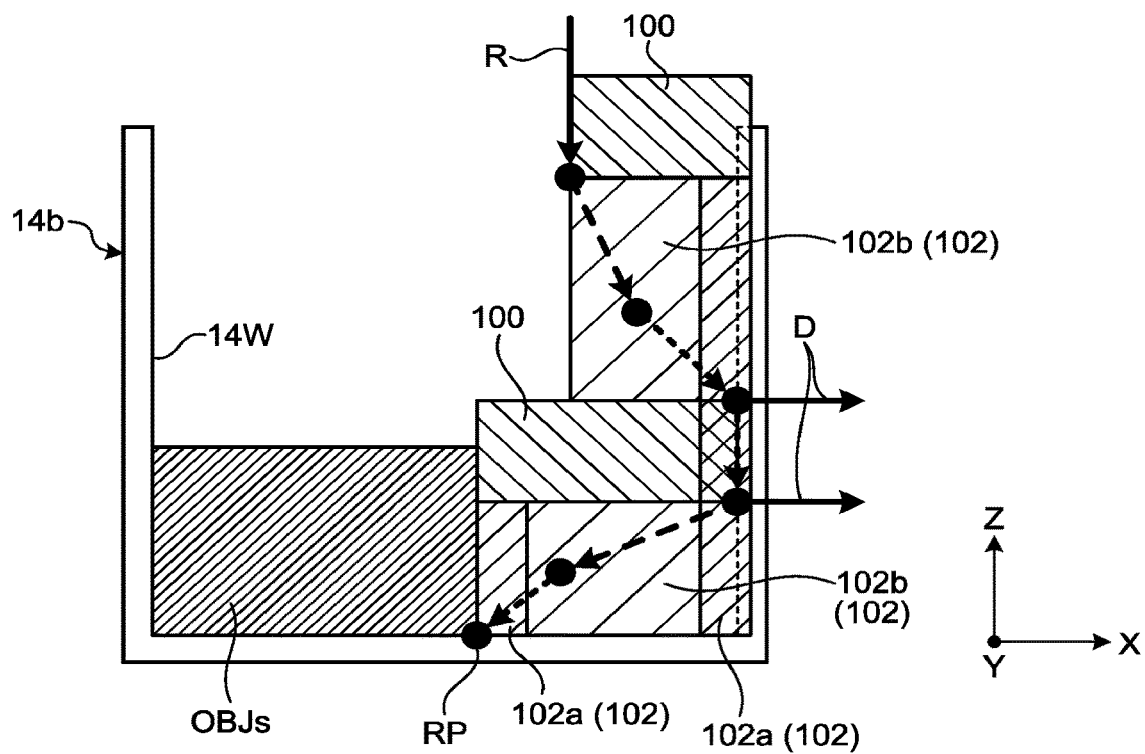
FIG. 33 is an exemplary and schematic explanatory diagram for exceptional generation of a moving route in the pressing control in FIG. 32.

To calculate the moving route through the above-described procedure, in a small space to the moving destination RP, the via point may not be able to be generated using the margin set considering sensing error of the sensor (the camera 32b and the laser range scanners 33a and 33b). In this case, in the embodiment, as illustrated in FIG. 32 and FIG. 33, the object OBJ is pressed by the force control against the wall 14W of the container 14b being a moving destination or the side surface of the previously set object OBJs to eliminate the sensing error, to calculate at least part of the moving route to the moving destination RP without a margin set. In FIG. 32 and FIG. 33, the second region 100 set for the previously set object OBJs partially overlaps with the third region 102 (first control region 102a) set for the wall 14W. As a result, as illustrated in FIG. 32, the hand 22 grasping the object OBJ cannot approach the moving destination RP. In such a case, the route calculator 56 gives priority to the first control region 102a, and handles the overlapping region as the first control region 102a. That is, as illustrated in FIG. 33, the object OBJ is pressed against the wall 14W of the container 14b in the direction of arrow D, i.e., substantially orthogonal to the wall 14W, under the first pressing control of the force control, and the object OBJ passes through the second region 100 (first control region 102a) along the moving route R. In this case, to move in the second region 100 (first control region 102a) under the force control, the hand 22 at least behaves in the first pressing control, satisfying the first pressing condition, for example, at the moving speed of a given threshold or less by pressing force of a given threshold or less, at the time of passing through the first control region 102a of the third region 102. This results in preventing the object OBJ from receiving external force caused by the pressing control more than necessary. Specifically, as in the second region, the hand 22 is restricted or prohibited in principle from passing the first control region 102a in which the pressing control is performed, and in the first control region 102a the object OBJ and the hand 22 is exceptionally allowed to pass only under the pressing control. In such a case, if there is an overlapping region between the second region 100 and the first control region 102a, the first control region 102a may be given priority and set to the first control region 102a to generate the route of the hand 22 operated by the pressing control.

Figure 34:
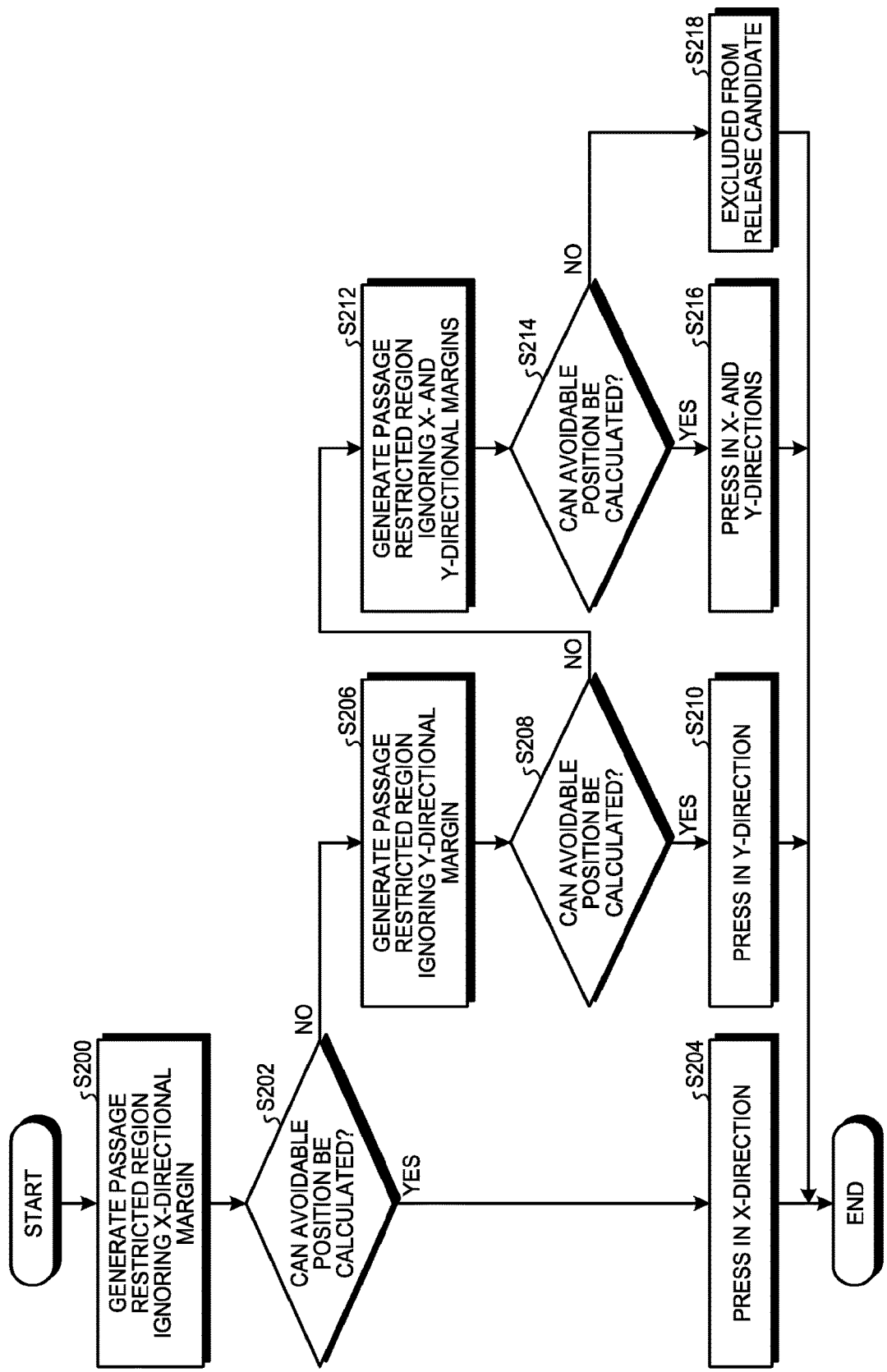
FIG. 34 is an exemplary flowchart for setting a pressing direction under the pressing control in FIG. 33.

FIG. 34 illustrates an exemplary procedure of deciding a pressing direction in the pressing control in the first control region 102a of the third region 102. First, the route calculator 56 generates a passage restricted region, ignoring the X-directional margin (S200). After succeeding in calculating the avoidance position by ignoring the X-directional margin (Yes at S202), the route calculator 56 sets the X-direction to the pressing direction (S204), temporarily ending the procedure. At S202, after failing to calculate the avoidance position (No at S202), the route calculator 56 generates a passage restricted region, ignoring the Y-directional margin (S206). After succeeding in calculating the avoidance position by ignoring the Y-directional margin (Yes at S208), the route calculator 56 sets the Y-direction to the pressing direction (S210), temporarily ending the procedure.

After failing to calculate the avoidance position at S208 (No at S208), the route calculator 56 generates a passage restricted region, ignoring the X- and Y-directional margins (S212). After succeeding in calculating the avoidance position by ignoring the margins in the X- and Y-directional margins (Yes at S214), the route calculator 56 sets the X- and Y-directions to pressing directions (S216), temporarily ending the procedure. After failing to calculate the avoidance position at S214 (No at S214), the route calculator 56 excludes the moving destination RP at which the object OBJ is to be placed from location candidates for releasing the object OBJ in S218. In this case, the route calculator 56 sets the moving destination RP at another position, and recalculates the moving route of the object OBJ thereto.

Figure 35:
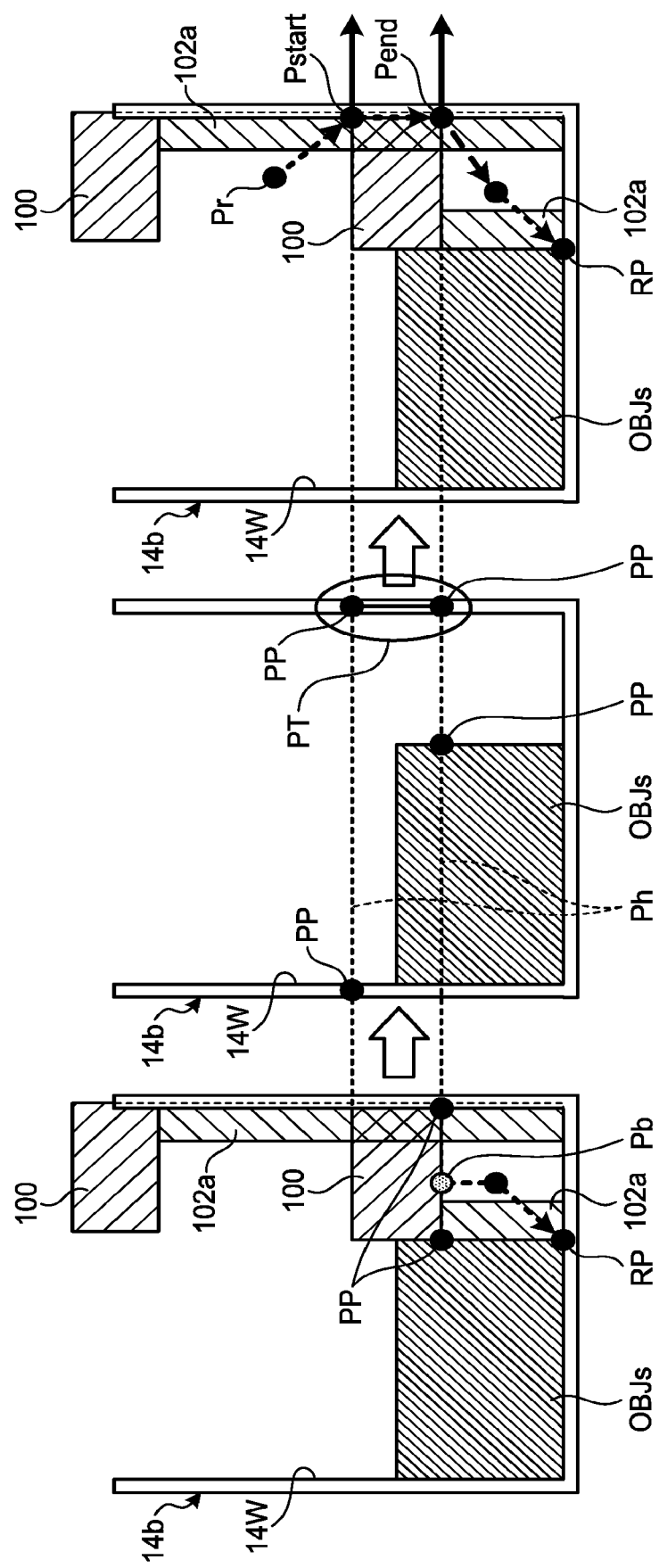
FIG. 35 is a schematic explanatory diagram illustrating exemplary pressing surface and pressing position by a controlled pressing operation of the object handling device of the embodiment.

To generate the passage restricted region (second region 100), ignoring the X- or Y-directional margin, the equation $\delta_x = \sigma_x = 0$ or $\delta_y = \sigma_y = 0$ may be established at the time of setting the second region 100 described with reference to FIG. 12 to FIG. 23. In the case of pressing the object only in the X-direction as an example, the position and pose of the passage restricted region (second region 100) generated where $\delta_x=\sigma_x=0$ holds is defined to be $^{TOTE}T_{KeepoutPressX,i}$ (i=1, n), and the size thereof is defined to be $^{TOTE}S_{KeepoutPressX,i}$. With reference to FIG. 35, the following describes a specific operational flow of generating the via points in the pressing control.

First, as illustrated in the left-side drawing of FIG. 35, the route calculator 56 searches for a possible pressing position PP at the height of the fingertip TCP in the pre-avoidance position being the point Pb. To search for a pressing surface, the route calculator 56 sets both directional margins to zero, that is, $\delta_x=\sigma_x=\delta_y=\alpha_y=\delta_z=\sigma_z=0$ when setting the second region 100 described with reference to FIG. 12 to FIG. 23. By ignoring the margins, the route calculator 56 can generate a region in which the hand 22 or the grasped object OBJ actually contacts with the previously set object OBJs or the wall 14W of the container 14b as a moving destination. The region generated in this manner is referred to as a contact region. The position and pose of this region is defined to be $^{TOTE}T_{Contact,i}$ (i=1, ..., n), and the size thereof is defined to be $^{TOTE}S_{Contact,i}$. In the case of pressing the object only in the X-direction, X-coordinate $^{TOTE}T_{ContactX,j}$ (j=1, ..., 2n) of a side vertical to the X-axis among the sides of the contact region can be calculated by the following Expression 24:

$$^{TOTE}x_{ContactX,2i-1} = {}^{TOTE}x_{Contact,i} - {}^{TOTE}sx_{Contact,i}/2 \quad \text{(Expression 24)}$$
$$^{TOTE}x_{ContactX,2i} = {}^{TOTE}x_{Contact,i} - {}^{TOTE}sx_{Contact,i}/2.$$

From the calculated X-coordinates, the X-coordinate of a plane included in a region having the same Y- and Z-coordinates as the pre-avoidance position Pb ($=^{TOTE}t_{RAP[0]}$) is extracted and combined with the Y- and Z-coordinates of $^{TOTE}t_{RAP[0]}$ to be set to a possible pressing position PP ($=^{TOTE}t_{PressX,i}$).

Subsequently, as illustrated in the middle drawing of FIG. 35, the route calculator 56 searches for the possible pressing position PP at a height ph for interference check next to the height of the fingertip TCP in the pre-avoidance position Pb. As illustrated in FIG. 26, the heights ph are listed in ascending order in the height list for interference check. That is, when the interference check height ph at which the pre-avoidance position Pb is calculated is defined to be $^{TOTE}z_{Check,i}$, the next higher height ph is defined to be $^{TOTE}z_{Check,i+1}$. This position is added as a reference to the possible pressing position ($=^{TOTE}t_{PressX,i}$) by the same method as in the left-side drawing of FIG. 35.

From among the found possible pressing positions PP $^{TOTE}t_{PressX,i}$ in the left-side and middle drawings of FIG. 35, the route calculator 56 extracts a set of two positions having the same X- and Y-coordinates and different Z-coordinates, which is defined as a pressing surface PT. If two or more pressing surfaces PT are extracted, a surface closest to the pre-avoidance position Pb ($=^{TOTE}t_{RAP[0]}$) is selected to be the pressing surface PT. The top end of the selected pressing surface PT is defined to be $^{TOTE}t_{PressX+}$, and the bottom end thereof is defined to be $^{TOTE}t_{PressX-}$.

Next, as illustrated in the right-side drawing of FIG. 35, the route calculator 56 sets a pressing standby position Pr, a pressing start position Pstart, and a pressing end position Pend along the selected pressing surface PT, and adds them to the via points of the moving route R.

In the pressing start position Pstart, the hand 22 continues pressing until reaching a force target value, and the pressing start position can be set to the top end $^{TOTE}t_{PressX+}$ of the pressing surface calculated in the middle drawing of FIG. 35. The pressing end position Pend represents a target position to which the hand 22 moves from the pressing start position Pstart while continuing pressing, and can be set to the bottom end $^{TOTE}t_{PressX-}$ of the pressing surface calculated in the middle drawing of FIG. 35.

The pressing standby position Pr is located apart from the pressing surface with a margin in order to allow the hand 22 to move to the pressing start position Pstart. The X-direction of the pressing standby position Pr can be from the pressing start position Pstart toward the pre-avoidance position Pb ($=^{TOTE}t_{RAP[0]}$). The Z-direction thereof can be offset vertically upward by the margin. In this case, the pressing standby position $Pr=^{TOTE}t_{PressXApp}$ can be calculated by Expression 25:

$$^{TOTE}t_{PressXApp} = \begin{bmatrix} ^{TOTE}x_{PressX+} + {}^{TOTE}x_{PressMargin} \times \\ \text{sign}(^{TOTE}t_{RAP[0]} - {}^{TOTE}t_{PressX+}) \\ ^{TOTE}y_{PressX+} \\ ^{TOTE}z_{PressX} + {}^{TOTE}z_{PressMargin} \end{bmatrix} \quad \text{(Expression 25)}$$

where $^{TOTE}X_{PressMargin}$ represents positive margin values in X-direction and $^{TOTE}Z_{PressMargin}$ represents positive margin values in Z-direction.

When the area of the pressing surface PT is equal to or smaller than a given threshold with respect to the pressing surface of the object OBJ, that is, when the contact area between the pressing surface of the object OBJ and the pressing surface of the obstacle is smaller than a contact threshold, the pressing control (force control) is not performed. In this case, while pressing, the hand 22 may change in the grasping pose of the object OBJ due to an insufficient contact surface, or the object OBJ may be damaged or deformed, applied with external force. In such a case the route calculator 56 changes the moving destination RP and recalculates the moving route R not to forcibly perform the pressing control.

Figure 36:
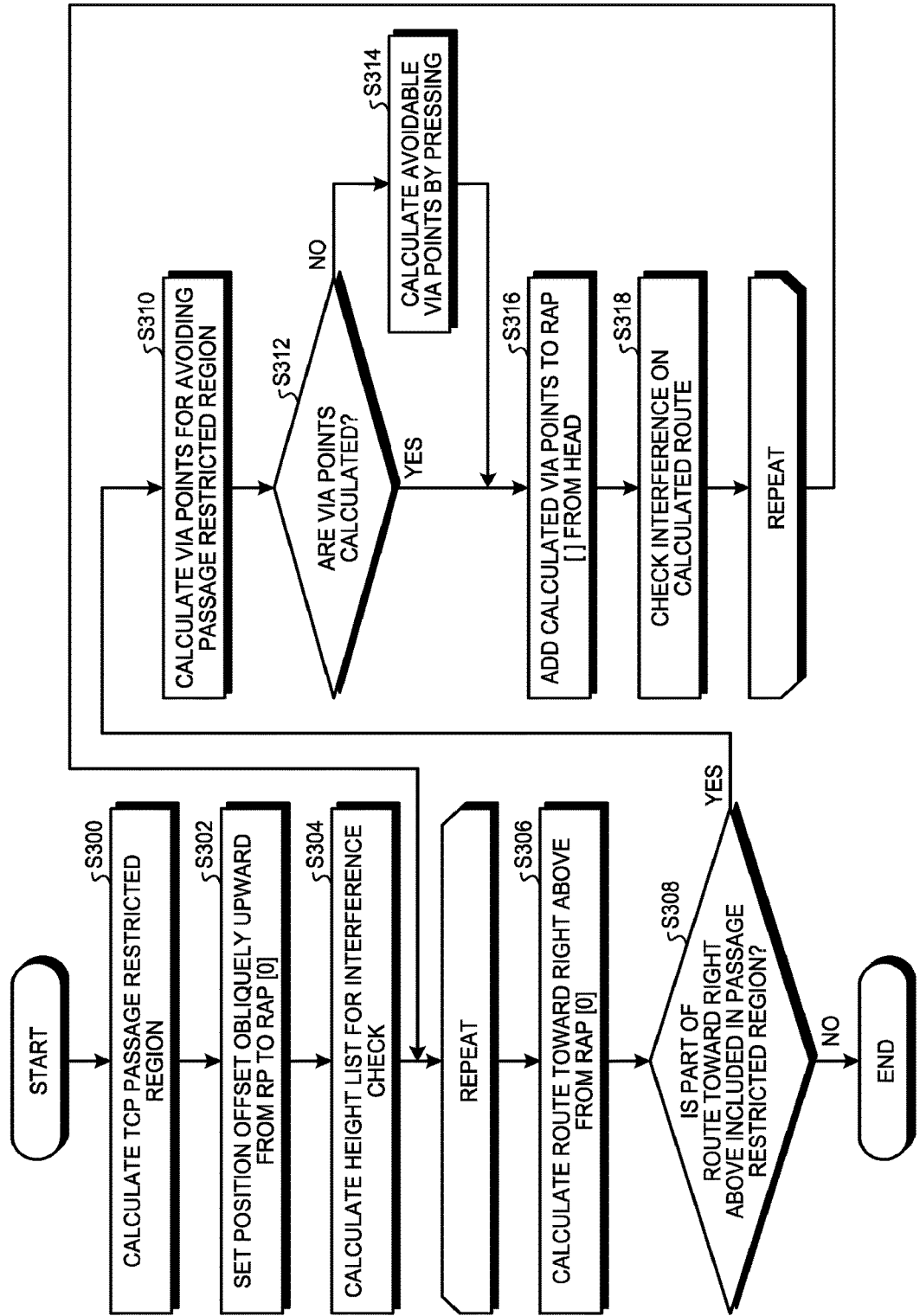
FIG. 36 is an exemplary flowchart for generating via points on a moving route of the object or hand by the object handling device of the embodiment.
Figure 37:
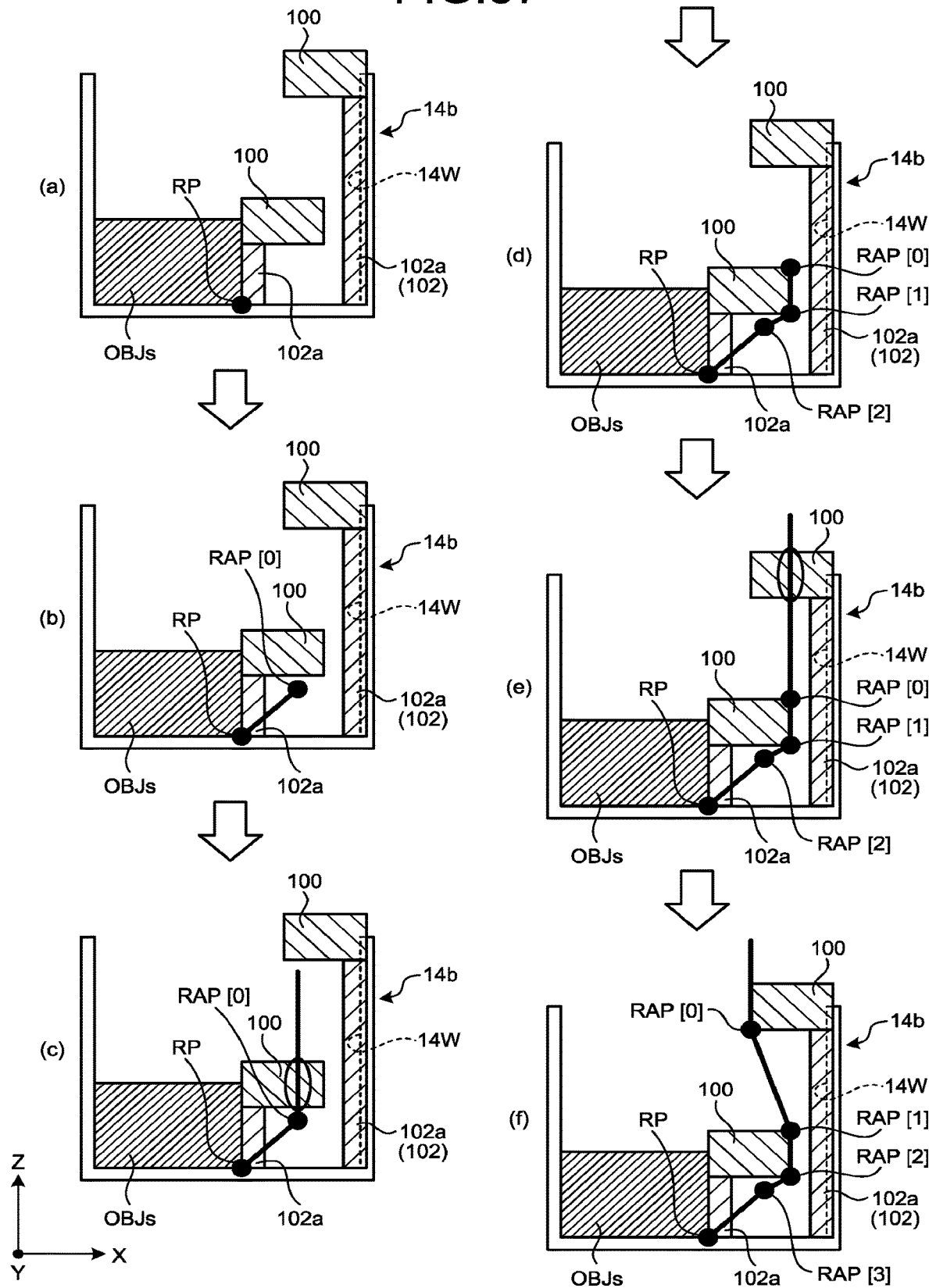
FIG. 37 is an exemplary and schematic explanatory diagram of positions of the via points on the moving route generated in FIG. 36.

The following describes an example of generating the via points on the moving route of the object OJB or hand 22 after the region setter 55 sets the region in the object handling system 1 or object handling device configured as above, referring to the flowchart in FIG. 36. FIG. 37 is an exemplary and schematic explanatory diagram illustrating the positions of the generated via points on the moving route. FIG. 37 is a combination of part of the foregoing drawings for the sake of better understanding of generation of the via points. For the sake of simplicity, FIG. 37 illustrates only the second region 100 and the first control region 102a of the third region 102.

First, the region setter 55 calculates the passage restricted region for the fingertip TCP, that is, the second region 100 (S300). For example, as illustrated in (a) of FIG. 37, the region setter 55 acquires the shape of the container 14b, the position of the wall 14W, the position, size, and dimensions of the previously set object OBJs in the container 14b on the basis of the status information based on images generated by the camera 32b and acquired by the image processor 52, for example. The region setter 55 then calculates the second region 100 and the first control region 102a of the third region 102 in accordance with the procedures described with reference to FIG. 12 to FIG. 23. The region setter 55 calculates or sets the third region 102 including the first control region 102a and the second control region 102b and the first region 104 together with the second region 100.

Subsequently, in (b) of FIG. 37, the route calculator 56 sets the obliquely upward offset position from the moving destination RP as the initial via point RAP[0] of the generated moving route R, as described with reference to FIG. 27 (S302). The route calculator 56 calculates the height list for interference check as described with reference to FIG. 26 (S304).

The route calculator 56 repeatedly performs the following operations to successively set the via points. That is, the route calculator 56 successively decides the via points following the procedures described with reference to FIG. 27 to FIG. 35. First, as illustrated in (c) of FIG. 37, the route calculator 56 calculates a linear route from the initially set via point RAP[0] toward directly above (S306), and determines whether part of the linear route is included in the passage restricted region (second region 100) (S308). After determining that part of the linear route is included in the passage restricted region (second region 100) (Yes at S308), as illustrated in (d) of FIG. 37, the route calculator 56 calculates the via points for avoiding the passage restricted region (second region 100) in accordance with the procedure described above with reference to FIG. 28 (S310). (d) of FIG. 37 illustrates the next calculated via point.

After failing to calculate new via points (No at S312, the route calculator 56 calculates the avoidance via points in the pressing control (S314), as described with reference to FIG. 32 and FIG. 33. After successfully calculating the via points at S312 (Yes at S312) or calculating the avoidance via points at S314, the route calculator 56 adds the calculated via points to RAP[ ] from the head in order, as illustrated in (d) of FIG. 37 (S316). For example, the route calculator 56 performs numbering of the via points such that the newest via point is set to RAP[0]. The route calculator 56 then checks interference to find whether the moving route R including the newest via point interferes with the second region 100 (S318), and returns to S306 to search for the next via point. (e) of FIG. 37 illustrates an example that the route from the newest via point RAP[0] toward directly above, which is calculated to search for the next via point, interferes with the second region 100, which requires calculation of the avoidance via point.

(f) of FIG. 37 illustrates a newest avoidance via point RAP[0] calculated. The route calculator 56 repeats the processing from S306 to calculate the next via point. After determining that part of the linear route toward directly above is not included in the passage restricted region (second region 100) at S308 (No at S308), the route calculator 56 temporarily ends the procedure. That is, there is no interfering second region 100 found in creating the moving route R. In this case, as illustrated in (f) of FIG. 37, for example, the bottom edge of the previously set object OBJs is set to the moving destination RP. The initially set via point in (b) of FIG. 37 is RAP[3]. The next calculated via point is RAP[2]. The following calculated via point is RAP[1], and the newest via point is RAP[0]. That is, the hand 22 grasping the object OBJ approaches the container 14b from above through the via points RAP[0], RAP[1], RAP[2], and RAP[3] in order along the created moving route R to rapidly arrive at the moving destination RP and place the object OBJ without interfering with the obstacle.

Although not illustrated in the flowchart in FIG. 36, after failing in calculating the avoidance via point in the pressing control at S314, the route calculator 56 determines that the object OBJ cannot be moved to or placed at the initially set moving destination RP, and generates the moving route R to another moving destination RP, following the flowchart.

In the example above, the second region 100 is set on the top surface of the object OBJs. However, if the objects can be placed on the top of each other, the top surface of the previously set object OBJs may be set to another region different from the second region 100 to generate the moving route R which enables stack placement. The route calculator 56 may appropriately change the region to set depending on an placement condition at the moving destination RP.

As described above, the object handling system 1 or object handling device of the embodiment includes the hand 22, information acquirers such as the image processor 52 and the signal processor 53, the region setter 55, the route calculator 56, and the robot controller 57 (motion controller). The hand 22 can grasp the object OBJ. The information acquirers such as the image processor 52 and the signal processor 53 acquire at least the object information representing the object OBJ grasped by the hand 22, and the status information representing the initial position HP and the moving destination RP of the object OBJ. The region setter 55 sets the first region 104, the second region 100, and the third region 102 in accordance with the object information and the status information. In the first region 104 the hand 22 grasping the object OBJ is allowed to move without being restricted by the obstacle (the container 14b or the previously set object OBJs) present in the space between the initial position HP and the moving destination RP. In the second region 100 the hand 22 is restricted from moving due to presence of the obstacle. The third region 102 is at least partially set below the second region 100, and in the third region 102 the hand 22 is operated under the force control. The route calculator 56 calculates the moving route R along which the object OBJ is moved from the initial position HP to the moving destination RP with reference to the first region 104, the second region 100, and the third region 102. The robot controller 57 controls the manipulator 20 to move the hand 22 grasping the object OBJ along the moving route R.

As configured above, the object handling system 1 or object handling device can avoid a collision with the obstacle, which would otherwise inflict damage to the hand 22 or the object OBJ grasped by the hand 22, and generate the moving route R for a small space, to efficiently and safely move the object OBJ. That is, the object handling system 1 or object handling device can easily maximize the packing density of the objects OBJ in the container 14b, reducing transportation cost. Further, the object handling system 1 or object handling device can move the object OBJ at a higher speed, utilizing the first region 104 and safely move the object OBJ without interfering with the second region 100, utilizing the third region 102, thereby improving transfer or placement efficiency (transfer cycle) of the object OBJ.

As the second region 100, the region setter 55 of the object handling system 1 or object handling device may set the second region 100 in which the hand 22 is restricted from approaching from above to below the obstacle, and the first control region 102a with the smaller margin than the second region 100 with respect to the obstacle. The first control region 102a is set along the obstacle below the second region 100 and therein, the hand 22 is restricted from approaching the obstacle from the lateral direction. Owing to this configuration, the second region 100 can be easily set in accordance with the object OBJ or the operation of the hand 22.

The region setter 55 of the object handling system 1 or object handling device may set the second control region 102b adjacent to the first control region 102a on the opposite side of the obstacle. Owing to this configuration, the second control region 102b can be easily set, allowing the hand 22 to appropriately operate under the pressing control in the first control region 102a of the third region 102.

As the force control, the object handling system 1 or object handling device may perform the first pressing control under the first pressing condition, to press the object OBJ against the surface of the obstacle substantially orthogonally, when the hand 22 is to pass the first control region 102a along the moving route R calculated by the route calculator 56. In this case, the object handling system 1 or object handling device can generate another moving route R along which the object OBJ can be moved without being damaged, after failing to generate the moving route due to the second region 100.

As the force control, the object handling system 1 or object handling device may perform the second pressing control in the first control region 102a under the second pressing condition, to press the object OBJ against the edge of a placement region including the moving destination RP to land the object OBj therein along the moving route R calculated by the route calculator 56. Owing to this configuration, the object handling system 1 or object handling device can set the object OBJ in tight contact with the wall 14W of the container 14b or the previously set object OBJs. Further, the object OBJ or the hand 22 can be prevented from being damaged.

As the force control, the object handling system 1 or object handling device may perform the repulsive control over the hand 22 grasping the object OBJ in contact with the obstacle in the second control region 102b along the moving route R, to control the hand 22 to repulsively move the object OBJ apart from the surface of the obstacle and pass therethrough. In this case, the object handling system 1 or object handling device can eliminate measurement error in the sensor 30, if it occurs, and prevent the object OBJ and the hand 22 from colliding with the wall 14W or the side surface of the object OBJs and being damaged.

The embodiments have described an example of dividing the third region 102 into the first control region 102a and the second control region 102b, however, the third region 102 may be not divided into the first control region 102a and the second control region 102b but be set as one region. In this case, in the third region 102 where the force control is performed, either of the pressing control and the repulsive control of the force control is performed. Alternatively, in the entire third region 102 a combination of the pressing control and the repulsive control may be performed, such that the pressing control and the repulsive control are switched in accordance with a detected value of the force sensor 31, for example.

In the first pressing control, the route calculator 56 of the object handling system 1 or object handling device may not perform the force control but change the moving destination RP and recalculate the moving route R when the contact area between the pressing surface of the object OBJ and the pressing surface of the obstacle is smaller than a contact threshold. Due to insufficient contact surface, the hand 22 grasping the object OBJ may change in grasping pose, or the object OBJ may receive external force and be damaged or deformed. In view of this, the route calculator 56 changes the moving destination RP and recalculates the moving route R not to forcibly perform the pressing control.

The object handling method of the embodiment includes acquiring at least the object information representing the object OBJ grasped by the hand 22 and the status information representing the initial position HP and the moving destination RP of the object OBJ. The object handling method further includes setting, when the hand 22 grasping the object OBJ moves from the initial position HP to the moving destination RP, the first region 104 in which the hand 22 is allowed from moving without being restricted by the obstacle present in the space between the initial position HP and the moving destination RP, the second region 100 in which the hand 22 is restricted from moving due to presence of the obstacle, and the third region 102 in which the hand 22 is operated under the force control, in accordance with the object information and the status information. The object handling method also includes calculating the moving route R along which the object OBJ is moved from the initial position HP to the moving destination RP with reference to the first region 104, the second region 100, and the third region 102. The object handling method further includes moving the hand 22 grasping the object OBJ along the moving route R.

According to such a method, the moving route R in a small space can be generated while a collision with the obstacle is avoided, which would otherwise damage the hand 22 or the object OBJ grasped by the hand 22, making it possible to efficiently and safely move the object OBJ. This can lead to easily maximizing the packing density of the objects OBJ in the container 14b, lowering transportation cost. Additionally, the hand 22 can be moved at a higher speed utilizing the first region 104 and safely moved without interfering with the second region 100 utilizing the third region 102, enabling improvement in motion and placement efficiency (transfer cycle) of the objects OBJ.

A handling program executed by the object handling device of the embodiment is recorded and provided in an installable or executable file format in a semiconductor memory device such as a CD-ROM, a USB memory, and an SSD, or on a computer-readable recording medium such as a digital versatile disc (DVD).

The handling program executed by the object handling device of the embodiment may be stored and provided in a computer connected to a network such as the Internet by being downloaded via the network. The handling program executed by the object handling device of the embodiment may be provided or distributed via a network such as the Internet. Furthermore, the handling program executed by the object handling device according to the embodiment may be incorporated in a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object handling control device, comprising:
one or more processors configured to:
acquire at least object information and status information, the object information representing an object grasped by a grasper, the status information representing an initial position and a destination of the object;
set, when the grasper grasping the object moves from the initial position to the destination, a first region, a second region, and a third region in accordance with the object information and the status information, the first region being a region in which the grasper is allowed to move without being restricted by an obstacle present in a space between the initial position and the destination, the second region being a region in which the grasper is restricted from moving due to the obstacle, the third region at least part of which is set below the second region, the third region being a region in which the grasper is operated under force control; and calculate a moving route along which the object is moved from the initial position to the destination with reference to the first region, the second region, and the third region, wherein the third region includes:
a first control region in which a pressing control is performed as the force control, and
a second control region in which a repulsive control is performed as the force control, and in the pressing control, the object is pressed against a surface of the obstacle substantially orthogonally under a first pressing condition, and in the pressing control, the one or more processors change the destination and recalculates the moving route when a contact area between a pressing surface of the object and a pressing surface of the obstacle is smaller than a contact threshold.

2. The object handling control device according to claim 1, wherein in the second region, at least the grasper is restricted from approaching the obstacle from upward to downward.

3. An object handling device comprising:
the object handling control device according to claim 1;
a grasper; and
a motion controller that causes the grasper grasping the object to move along the calculated moving route.

4. An object handling method, comprising:
acquiring at least object information and status information, the object information representing an object grasped by a grasper, the status information representing an initial position and a destination of the object;
setting, when the grasper grasping the object moves from the initial position to the destination, a first region, a second region, and a third region in accordance with the object information and the status information, the first region being a region in which the grasper is allowed to move without being restricted by an obstacle present in a space between the initial position and the destination, the second region being a region in which the grasper is restricted from moving due to the obstacle, the third region at least part of which is set below the second region, the third region being a region in which the grasper is operated under force control;
calculating a moving route along which the object is moved from the initial position to the destination with reference to the first region, the second region, and the third region; and
moving the grasper grasping the object along the moving route wherein the third region includes:
a first control region in which a pressing control is performed as the force control, and
a second control region in which a repulsive control is performed as the force control, and in the pressing control, the object is pressed against a surface of the obstacle substantially orthogonally under a first pressing condition, and in the pressing control, further changing the destination and recalculating the moving route when a contact area between a pressing surface of the object and a pressing surface of the obstacle is smaller than a contact threshold.

5. A computer program product including programmed object-handling instructions embodied in and stored on a non-transitory computer readable medium, wherein the instructions, when executed by a computer, cause the computer to perform:

acquiring at least object information and status information, the object information representing an object grasped by a grasper, the status information representing an initial position and a destination of the object;
setting, when the grasper grasping the object moves from the initial position to the destination, a first region, a second region, and a third region in accordance with the object information and the status information, the first region being a region in which the grasper is allowed to move without being restricted by an obstacle present in a space between the initial position and the destination, the second region being a region in which the grasper is restricted from moving due to the obstacle, the third region at least part of which is set below the second region, the third region being a region in which the grasper is operated under force control; and
calculating a moving route along which the object is moved from the initial position to the destination with reference to the first region, the second region, and the third region; and
moving the grasper grasping the object along the moving route wherein the third region includes:
a first control region in which a pressing control is performed as the force control, and
a second control region in which a repulsive control is performed as the force control, and in the pressing control, the object is pressed against a surface of the obstacle substantially orthogonally under a first pressing condition, and in the pressing control, further changing the destination and recalculating the moving route when a contact area between a pressing surface of the object and a pressing surface of the obstacle is smaller than a contact threshold.

* * * * *